United States Patent
Karube et al.

(10) Patent No.: US 6,670,985 B2
(45) Date of Patent: Dec. 30, 2003

(54) IMAGE SENSING APPARATUS INCLUDING A CARD DEVICE CONNECTABLE TO AN INFORMATION PROCESSING DEVICE

(75) Inventors: Yukuo Karube, Yokohama (JP); Masaharu Eguchi, Yokohama (JP); Kentaro Matsumoto, Higashikurume (JP); Yoshihiro Shigemura, Yokohama (JP); Kenichi Kotoku, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/904,531

(22) Filed: Aug. 1, 1997

(65) Prior Publication Data

US 2001/0050720 A1 Dec. 13, 2001

Related U.S. Application Data

(62) Division of application No. 08/534,545, filed on Sep. 27, 1995.

(30) Foreign Application Priority Data

| Sep. 28, 1994 | (JP) | 6-258840 |
| Nov. 29, 1994 | (JP) | 6-294602 |
| Nov. 29, 1994 | (JP) | 6-294603 |
| Nov. 30, 1994 | (JP) | 6-296863 |
| May 15, 1995 | (JP) | 7-115953 |

(51) Int. Cl.$^7$ ............................................. H04N 5/225
(52) U.S. Cl. ........................... 348/207.1; 348/211.99
(58) Field of Search ................. 348/207, 211, 348/220, 221, 222, 373, 375, 552, 231, 232, 233, 15, 17, 18, 19, 207.1, 207.99, 211.99, 211.4, 220.1, 221.1, 211.14; H04N 5/225

(56) References Cited

U.S. PATENT DOCUMENTS 4,425,586 A    1/1984  Miller
4,589,020 A    5/1986  Akatsuka
5,138,459 A    8/1992  Roberts (List continued on next page.)

FOREIGN PATENT DOCUMENTS

| DE | 9305373 | 9/1993 | |
| EP | 0348623 | 1/1990 | |
| EP | 0382601 | 8/1990 | |
| JP | 3-23781 | * 1/1991 | .......... H04N/5/232 |
| JP | 4-180476 | * 6/1992 | .......... H04N/5/225 |
| JP | A6-176114 | 6/1994 | |
| JP | A6-178177 | 6/1994 | |
| JP | A6-178178 | 6/1994 | |
| KR | 90-15528 | 10/1990 | |
| KR | 93-17412 | 8/1993 | |
| WO | 9414274 | 6/1994 | |

OTHER PUBLICATIONS

European Search Report in corresponding foreign application EP95 115233 which cites the references disclosed in this Form PTO–1449.
Patent Abstracts of Japan, vol. 16, No. 492 (E–1278), Oct. 12, 1992, (Abstract of JP–A–4180476, Jun. 26, 1992).
Patent Abstracts of Japan, vol. 15, No. 148 (E–1056), Apr. 15, 1991, (Abstract of JP–A–3023781, Jan. 31, 1991).

Primary Examiner—Tuan Ho
(74) Attorney, Agent, or Firm—Morgan & Finnegan, L.L.P.

(57) ABSTRACT

A PC card camera has a structure in which a universal joint to which a video camera is attached is mounted on a PC card body. The video camera comprises an optical lens unit and a solid-state area sensor of the photoelectric transducer type. The universal joint holds the video camera in such a manner that the angular position thereof can be adjusted freely with respect to the PC card. The PC card body is provided with a guide for guiding the card into a slot provided in a personal computer, a connector for connecting the PC card to the personal computer, and a cut-out which prevents the PC card from being inserted incorrectly. With the PC card connected to the personal computer, the angular position of the video camera can be adjusted via the universal joint.

9 Claims, 32 Drawing Sheets

U.S. PATENT DOCUMENTS

| | | |
|---|---|---|
| 5,170,427 A | 12/1992 | Guichard et al. |
| 5,231,501 A * | 7/1993 | Sakai .......................... 348/552 |
| 5,260,795 A * | 11/1993 | Sakai et al. .................. 348/232 |
| 5,341,171 A * | 8/1994 | Mori et al. .................. 348/373 |
| 5,438,359 A * | 8/1995 | Aoki .......................... 348/207 |
| 5,475,441 A * | 12/1995 | Parulski et al. ............. 348/207 |
| 5,535,011 A | 7/1996 | Yamagami |
| 5,640,202 A * | 6/1997 | Kondo et al. ................ 348/222 |
| 5,652,630 A * | 7/1997 | Bertram et al. ............. 348/734 |
| 5,808,672 A * | 9/1998 | Wakabayashi et al. ...... 348/220 |
| 6,327,001 B1 | 12/2001 | Yamagishi |

\* cited by examiner

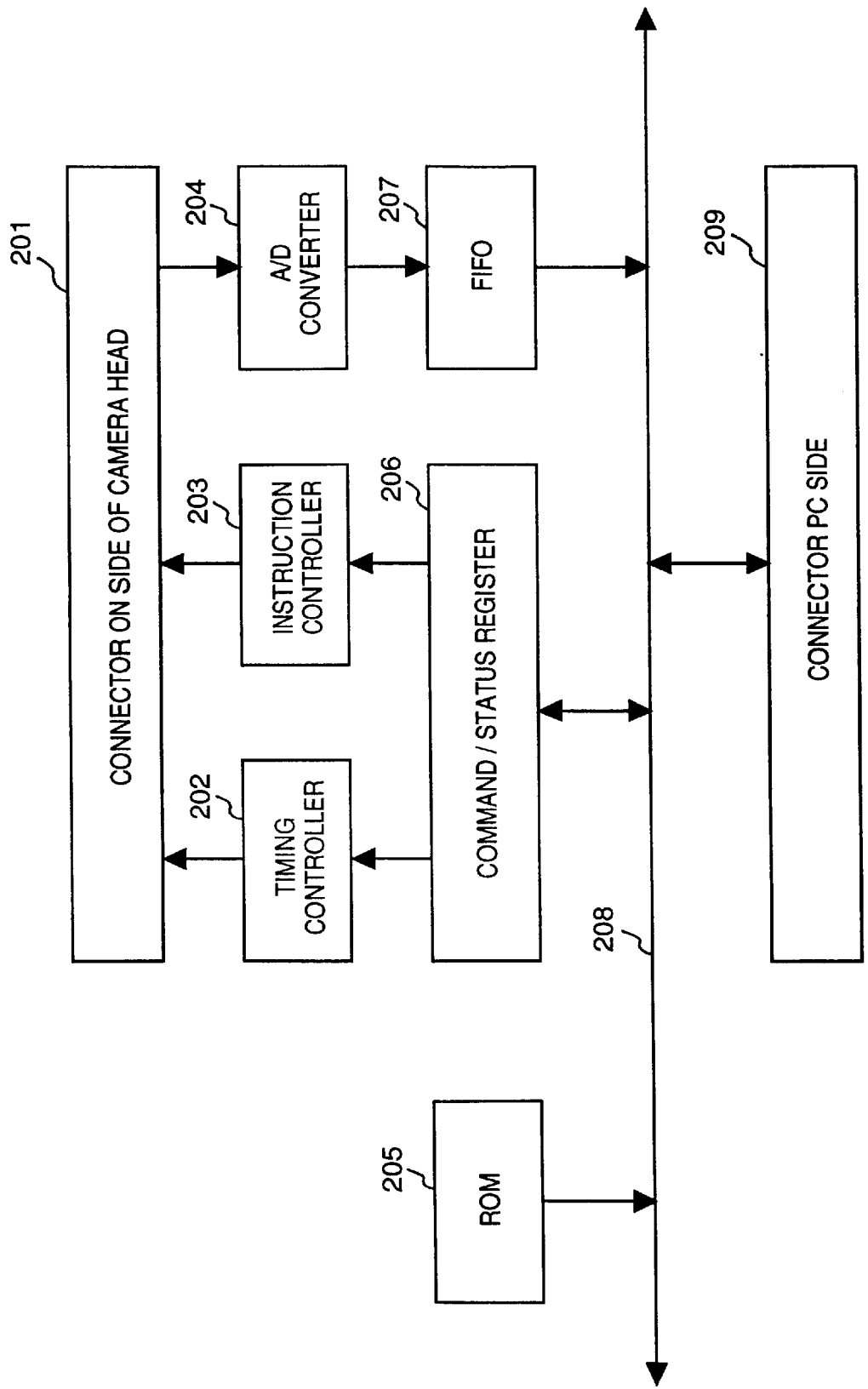

FIG. 14B

| ADDRESS | RW | BIT MAP |
|---|---|---|
| Ch | RW | ■ CONTROL / STATUS REGISTER <br><br> | D7 | D6 | D5 | D4 | <br> | ComBusy | DataRDY | 1stLine | FIFORSTW | <br><br>      | D3 | D2 | D1 | D0 | <br>      | FIFORSTR | INTEN | Start | RESERVED | <br><br> Start — RW — START BY WRITING 0 → 1 / STOP BY WRITING 1 → 0 <br><br> INTEN — — — ACCESS POSSIBLE SOLELY FROM SINGLE-CHIP SIDE. OUTPUT OF INTERRUPT SIGNAL ALLOWED. <br><br> FIFORSTR — — — ACCESS POSSIBLE SOLELY FROM SINGLE-CHIP SIDE. FIFO READ RESET. <br><br> FIFORSTW — — — ACCESS POSSIBLE SOLELY FROM SINGLE-CHIP SIDE. FIFO WITE RESET. <br><br> 1stLine — R — INDICATES FIRST LINE OF FIRST FRAME CLEARED AT SAME TIME THAT DataR RDY IS RESET. <br><br> DataRDY — RW — BECOMES "1" WHEN READOUT OF ONE LINE OF DATA IS POSSIBLE. BIT MUST BE SET TO "0" AFTER HOST READS OUT ONE LINE. <br><br> ComBusy — R — COMMAND FROM HOST IS NOT ACCEPTED WHILE THIS BIG IS "1". WRITE WITH REGARD TO THIS BIT IS INVALID AT ALL TIMES. |
| Eh | R | ■ DATA REGISTER <br><br> | D7 | D6 | D5 | D4 | D3 | D2 | D1 | D0 | <br> | IMAGE DATA | | | | | | | | |

FIG. 14C

| ADDRESS | RW | BIT MAP |
|---|---|---|
| 2h | W | ■ GAIN SETTING REGISTER <br><br> \| D7 \| D6 \| D5 \| D4 \| D3 \| D2 \| D1 \| D0 \| <br> \| RESERVED \|\|\|\| GAIN \|\|\|\| <br><br> GAIN: <br> 0000...×5 LINEAR OUTPUT <br> 0010...×20 LINEAR OUTPUT <br> 0100...×10 LINEAR OUTPUT <br> 0110...×40 LINEAR OUTPUT <br> 0001...×5 NON-LINEAR OUTPUT <br> 1000... AUTO |
| 4h | W | ■ STORAGE-TIME SETTING REGISTER <br><br> \| D7 \| D6 \| D5 \| D4 \| D3 \| D2 \| D1 \| D0 \| <br> \| STORAGE TIME \|\|\|\|\|\|\|\| |

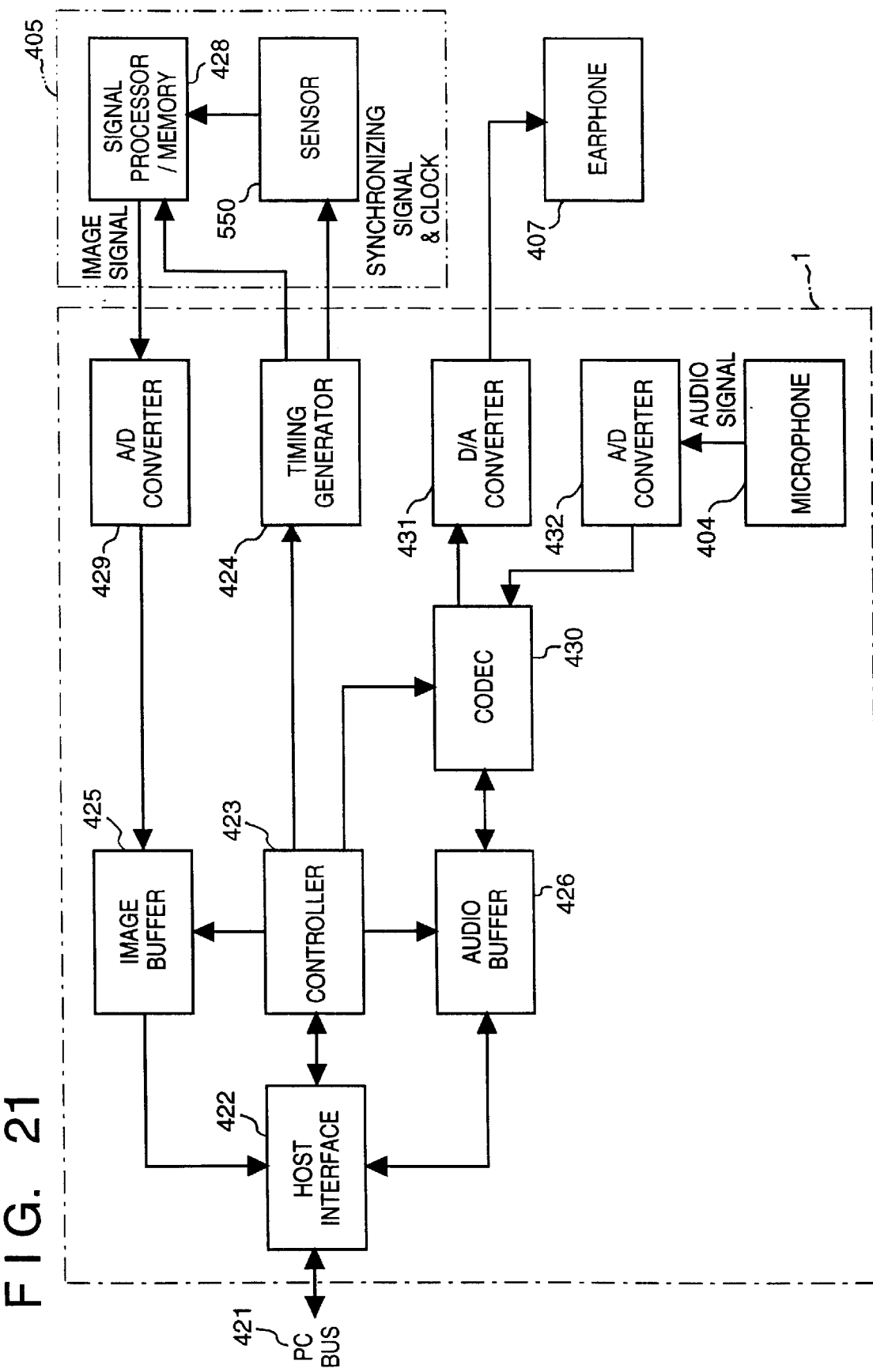

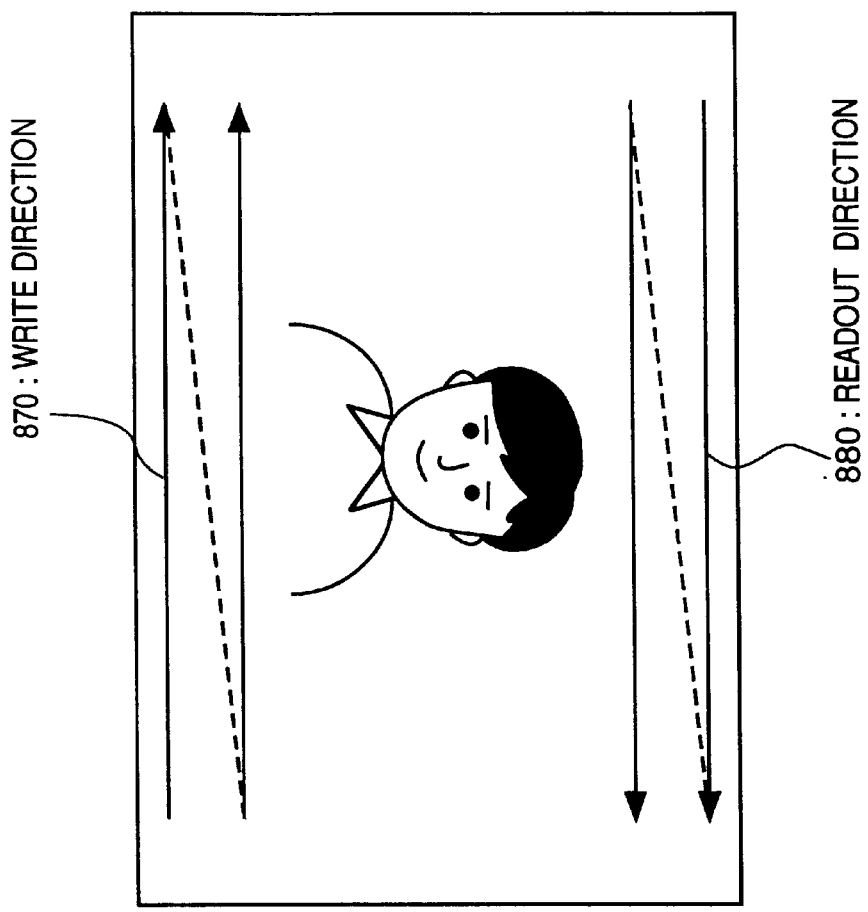
FIG. 28B
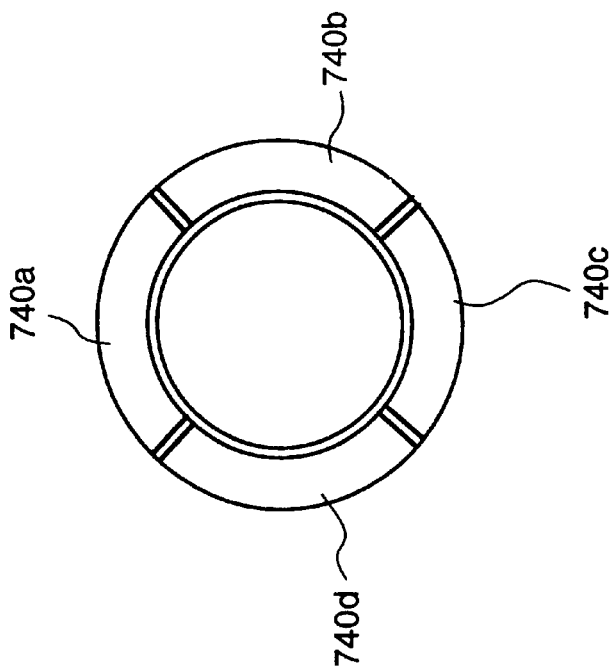

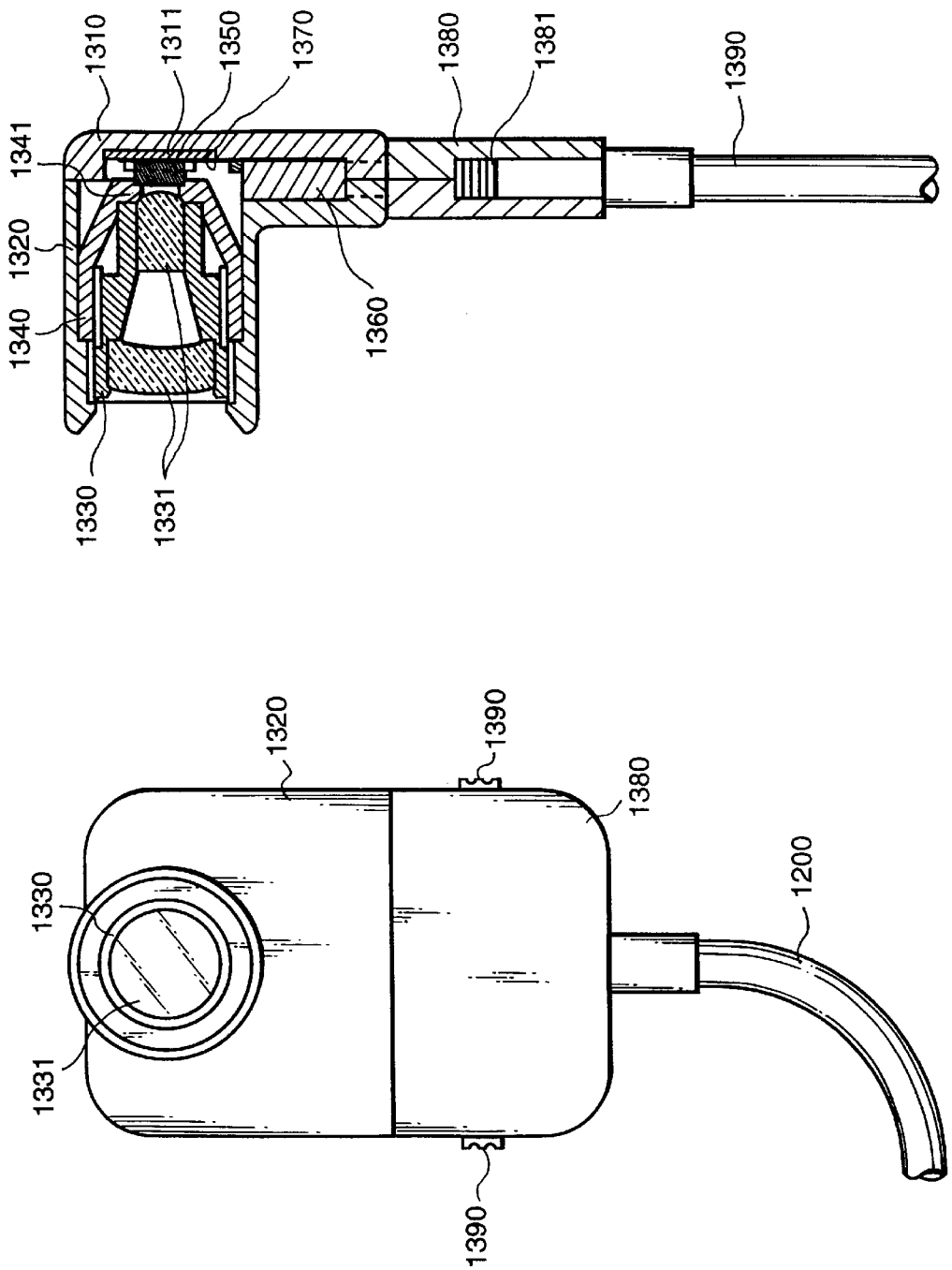

IMAGE SENSING APPARATUS INCLUDING A CARD DEVICE CONNECTABLE TO AN INFORMATION PROCESSING DEVICE

This is a divisional of co-pending application Ser. No. 08/534,545 filed Sep. 27, 1995, pending.

BACKGROUND OF THE INVENTION

This invention relates to a camera used with a computer for entering a moving or still picture into the computer, particularly an image input unit for entering an image into a computer via an extension card capable of being inserted into and withdrawn from the computer.

An example of an image input unit widely used in TV telephones and television conference systems is a video camera employing a photoelectric transducer-type solid-state area sensor such as a CCD. Further, a television conference system using a personal computer has recently been proposed. The system includes a video camera in the form of a separately manufactured product for the purpose of entering conference data and a photographic image of the speaker's face. The video camera is used by being placed on top or at the side of the personal computer.

FIG. 1 illustrates an example of the construction of a capture card for a mono-chrome video camera according to the prior art. In FIG. 4, numeral 1001 denotes a CCD image sensing device, 1002 a vertical driver for driving a vertical register of the CCD sensing device 1001, 1003 a timing pulse generator for generating timing pulses necessary for control of the CD image sensing device 1001 and for image processing, 1004 a synchronizing signal generator for generating an TSC synchronizing signal, and 1005 a signal processing circuit for executing AGC (automatic gain control) and a gamma correction. In the video camera constructed as shown in FIG. 1, the image signal from the CCD image sensing device is converted to a prescribed video signal by the signal processing circuit 1005 and the video signal is outputted. At this time, it is possible to output a moving picture of 30 frame per second as the video signal.

An NTSC image signal which is outputted from the above described video camera cannot be entered into a personal computer without converting the format of the signal. However, a personal computer into a slot of which a video capture board is inserted that converts an NTSC signal into an signal acceptable by the computer can input a sensed image.

FIG. 2 is an explanatory view illustrating an example of use of a conventional video camera connected to the personal computer in which the video capture board is installed. Shown in FIG, 2 are a personal computer 1010, a display 1011, a keyboard 1012 and a video camera 1013 having a camera body 1013a comprising a lens, a sensor and so on. The camera body 1013a is supported on a panning head 1013b in such a manner that its angular position can be freely adjusted vertically and horizontally. An AC cord 1013d supplies the camera body 1013a and panning head 1013b with electric power. A signal line 1013c allows a control signal for the panning head 1013b and an image signal from the camera body 1013a to be exchanged between the camera body 1013a and personal computer 1010. The image signal is sent to a video capture board (not shown) connected to an extension slot of the personal computer. The power for the camera body 1013a and panning head 1013b is supplied not from the personal computer but independently from its own AC cord. The lens unit has an autofocus function but is equipped with a manual or electrically powered zoom mechanism.

In addition to entering image information, there has been proposed an extension card which allows to enter audio, when it is installed in a personal computer. An example of such an extension card is as illustrated in FIG. 3. Specifically, a PC card 1051 capable of entering audio has a connector 1052 provided on the edge of the card on the side-opposite that connected to the main body of a personal computer or the like. The connector 1052 is connected to a connection box 1053 via a cable 1055 in order to connect the PC card to a microphone 1054 or other external acoustic device. Thus, various sounds such as a voice or music may be entered into a personal computer.

Further, as shown in FIG. 4, a telephone 1061 is equipped with a camera unit 1062 and a display unit 1063. This is a known example of a communication terminal used as a special-purpose TV telephone.

Further, there is an image communication apparatus in which a camera for a computer has monitor means capable of displaying the image of a communicating party continuously in a time series and image input means placed at a position where it will pick up the image of the operator from the side of the monitor means. Conventionally, the image communication apparatus used in this field is employed in a TV telephone or TV conference system. An example of the construction and arrangement of this apparatus are illustrated in FIG. 5. Numeral 1110 denotes the so-called camera unit, 1111 a camera lens unit, 1120 a monitor, 1121 a monitor display screen, 1122 the image of the other party to communication, 1123 the operator's own image, 1130 a computer constructing the communication apparatus, and 1131 a keyboard. The camera unit 1110 is placed at the periphery of the monitor unit 1120 of the computer set, and is connected to the computer 1130 by a connecting cord 1100. The operator's own image 1123 is picked up and transmitted to the other party by the camera unit 1110. The camera unit 1110 employs a CCD camera and often is integrated with a microphone. This apparatus has already reached the product stage for use in various applications such as simple TV conference systems using a personal computer having a video capture function.

In these image communication apparatus already available as finished products and now in practical use, the display capability of the monitor such as a CRT is outstanding in terms of, say, the number of display pixels, but the communication speed of the apparatus is somewhat wanting. Consequently, displaying the other party's image over the full screen and using monitor resolution to the maximum limit is almost never done. Often the display is confined to a small screen area whose size conforms to the speed of the communication line. Though it is possible to provide a full-screen display by enlarging pixels, this results is diminished picture quality. Further, since icons, menus and guidance displays are often presented on the screen, displaying the other party's image over the entire screen is not the general practice.

In the image communication-apparatus of FIG. 5, the problem of so-called "non-coincidence of line of sight" arises. Non-coincidence of line of sight refers to a situation in which the line of sight of the other party appearing on the screen and the line of sight of the speaker on this side of the screen do not coincide, thus giving rise to a sensation in which the two parties each seem to be speaking to a different person from the viewpoint of the other party. FIG. 6 is a conceptual view showing an example of a conventional sight coincidence mechanism which uses a half-mirror to solve the problem of non-coincidence of line of sight.

The arrangement of FIG. 6 differs from that of FIG. 5 in that a half-mirror 1701 is placed on the monitor line of sight of a user 1702 to split the optical path, and the camera, 1110 placed above the half-mirror 1701 is made approximately the same as the position of the line of sight of the other party's image on the monitor screen 1121, thereby making the lines of sight coincide.

The drawbacks of the prior arts set forth above will now be described.

The video camera of FIGS. 1 and 2 is disadvantageous in that the lens itself is large in size owing to the autofocus mechanism and zoom-lens mechanism, though the solid-state area sensor per se is small. In addition, since the panning head 1013b for adjusting the image pick-up angle and the independent power supply for the head are required, the overall size of the apparatus is enlarged.

Further, a video capture card is necessary to enter the image output of the video camera into the personal computer. However, since there is no allowance for an extension slot, the connection cannot be made. Furthermore, in order to control the operation of the video camera on the side of the personal computer, a control port such as an RS232C port on the side of the personal computer and a control circuit on the side of the video camera must be connected.

In a case where audio is entered in the PC card shown in FIG. 3, the PC card 1051 is inserted into the personal computer, the cable 1055 from the connection box 1053 is connected to the connector 1052 of the PC card and the microphone 1054 is connected to the connection box 1053. Thus, making the connections requires considerable labor, there are many cables and the connection box 1053 also is required. As a result, the PC card 1051, which was originally intended to be readily portable, becomes less easy to carry about and more difficult to use.

In the arrangement of FIG. 4, the device is a communication terminal capable of being used as a TV telephone or merely as a telephone. Portability is not taken into consideration and the device cannot be used in other types of applications.

With regard to the video camera shown in FIG. 5, it has been attempted to realize a TV telephone using a telephone line in combination with a video capture card. Since line speed is slow, however, it is quite impossible to send and receive images at 30 frames per second. For example, when one frame of a video signal is composed of 640×480 pixels, one frame is equal to 640×480×3 bytes or approximately one megabyte, where each of the colors R, G, B is composed of one byte of data. If 30 frames are transmitted every second, there is a 30-fold increase to about 30 megabytes per second. Even if compression is applied at a rate of 1/30, the required transfer rate will be 1 M bytes/sec=8 M bps. The transmission speed of a line is 28.8 kbps in the case of an ordinary telephone line and 64 kbps in the case of as ISDN, meaning that transmission of all of the image information is impossible. In general, therefore, the moving picture information transmitted has its image size or the number of frames reduced. There is need for a moving-picture entry system capable of being simply utilized at low cost with some reduction in the number of frames owing to the limitation in terms of communication speed.

The examples of the prior art shown in FIGS. 5 and 6 are as follows. Since the camera unit 1110 is placed at the periphery of the display 1121 of monitor 1120, parallax indicated at L in FIG. 5 occurs when the operator looks at the other party's image 1122. Though vertical parallax is shown in the example of FIG. 5, parallax is also produced horizontally by the position of the other party's image. In the state shown in FIG. 5, the equivalent of the distance between the centers of the two images 1122 and 1123 is the parallax in the horizontal direction. The fact that the line of sight of the other party and the operator's own line of sight do not match produces a disagreeable sensation. This is the "non-coincidence of line of sight". The state free of this phenomenon is referred to as "coincidence of line of sight". The same disagreeable sensation is produced when one's own image 1123 is checked.

A system resembling a so-called prompter is known as means for entering one's own image 1123 in a state in which the lines of sight match. As shown in FIG. 6, the means includes the half-mirror placed between the camera unit 1110 and the monitor unit 1120 to split the optical path. Since this arrangement uses the large half-mirror 1701, which is large enough to cover the monitor screen, the following problems arise:

(1) The system is vulnerable to contamination such as soiling by fingerprints owing to the presence of the half-mirror itself.

(2) The half-mirror required is placed in the space of two substantially quadrangular pyramids from both eyes of the user to the four-corners of the monitor screen and must be of a size capable of covering the image pick-up field angle of the camera, which is placed outside this space. This increases the overall dimensions of the apparatus.

(3) As a result, the apparatus cannot be manufactured at low cost.

(4) In a case where the apparatus is constructed using a personal computer, it is not possible to rapidly modify the apparatus to use it as an ordinary personal computer (namely to a state in which the optical-path splitting means has been excluded from the system).

SUMMARY OF THE INVENTION

An object of the present invention is to solve the aforementioned problems of the prior art.

Another object of the present invention is to provide an image input unit that is small in size, light in weight and highly portable.

Another object of the present invention is to provide an image input unit that can be easily connected to a personal computer and does not require its own power supply.

A further object of the present invention is to provide an image input unit in which the image pick-up angle can be adjusted in a simple manner.

According to the present invention, the foregoing objects are attained by providing an image sensing apparatus sensing an image to supply to an information processing device, comprising: a camera unit and a base unit connected to the camera unit, wherein the base unit includes: signal processing means for performing a process to supply an image signal from the camera unit to the information processing device; and timing control means for controlling a timing in which the image signal is supplied from the camera unit to the information processing device.

In accordance with a preferred embodiment of the invention, the camera unit comprises a lens, and a sensor converting incident light from an object through the lens into an image signal. This expedient is desirable in that it assures portability.

In accordance with a preferred embodiment of the invention, the signal processing means comprises storage means (such as a FIFO type memory) for storing an image signal sensed by the camera unit. This expedient allows signal processing in the apparatus.

In accordance with a preferred embodiment of the invention, the signal processing means comprises a register used for transmitting and receiving data to and from the information processing device.

In accordance with a preferred embodiment of the invention, the base unit is in a shape of card. This improves portability.

Still another object of the present invention is to provide an image sensing apparatus through which such a TV telephone function can be added to a compact, portable personal computer such as a notebook-type personal computer or to a personal information device such as a PDA (Personal Digital Assistant).

According to the present invention, this object is attained by providing an image sensing apparatus sensing an image to supply to an information processing device, said apparatus comprising: a camera unit; and a base unit connected to the camera unit, wherein the base unit having: signal processing means for processing to supply an image signal from the camera unit to the information processing device; and audio input means for inputting audio.

A further object of the present invention is to provide an image sensing apparatus through which a TV telephone function can be added to device not having a speaker, namely to a compact, portable personal computer such as a notebook-type personal computer or to a personal information device such as a PDA.

According to the present invention, this object is attained by providing an image sensing apparatus further comprising audio output means.

In accordance with a preferred embodiment of the invention, the audio input means is provided at a side surface of the base unit, the side surface being different from a surface at which the base unit is connected to the information processing device. This to use such as microphone even if the apparatus is connected to the information processing device.

In accordance with a preferred embodiment of the invention, the audio output means, such as earphone is provided at a same side surface of the base unit at which the base unit is connected to the camera unit.

Yet another object of the present invention is to provide an image sensing apparatus in which, by pointing a camera in an image capturing direction and then imaging a subject, image data which is correct in the vertical direction can be outputted to the apparatus even if the orientation at the upper portion of the apparatus is unnatural.

According to the present invention, this object is attained by providing an image sensing apparatus n image sensing apparatus comprising: image sensing means for sensing an image; a switch arranged around the image sensing means; storage means for storing image data obtained by the image sensing means; and means for altering a read-out sequence of the image data stored in the storage means in accordance with an operation of the switch.

By virtue of this arrangement, the order in which the captured image is read out is changed by manipulating the switch. This makes it possible to supply an image having any orientation irrespective of orientation of the camera. An image having the correct vertical orientation can be outputted even if the top of the camera is oriented to one side.

Further, in order to attain the same object, an image sensing device according to the present invention comprises: image sensing means for sensing an image; storage means for storing image data sensed by the image sensing means; gravity detection means for detecting a direction of the gravity; and means for altering a read-out sequence of the image data stored in the storage means in accordance with an output of the gravity detection means.

In accordance with this arrangement, the apparatus has gravity detection means adapted to sense the vertical direction by utilizing the force of gravity. On the basis of the sensed information, the order in which the captured image is read out is changed and it is possible to supply an image for which the direction of gravity is correct irrespective of the direction of the upper portion of the camera. An image having the correct vertical direction can be outputted even if the top of the camera is pointing to one side.

In accordance with a preferred embodiment of the invention, the image sensing device has display means for displaying the direction of the captured image.

In accordance with a preferred embodiment of the invention, the gravity detection means comprises a rotating pendulum.

In accordance with a preferred embodiment of the invention, the rotating pendulum comprises a rotary shaft which substantially coincides with a direction of image sensing by the image sensing means, and a sector-shaped portion that is perpendicular to the rotary shaft, and the image sensing apparatus comprises sensor means for sensing a position of the sector-shaped portion.

Yet another object of the present invention is to realize, by a rational and inexpensive approximate solution technique, the coincidence of lines of sight without relying upon a technique which makes lines of sight coincide, this being accomplished by obtaining a camera optic-axis arrangement in which agreement with the line of sight of the user is achieved while the front of a monitor is kept visible, as in the manner of means using the splitting of an optical path employed in the prior-art examples of FIGS. 5 and 6.

According to the present invention, this object is attained by providing an image sensing apparatus sensing an image to supply to an information processing device, comprising: a camera unit; a base unit connected to the camera unit, the base unit including signal processing means for performing a process to supply an image signal from the camera unit to the information processing device; fixing means for fixing the camera unit to the information processing device so that the camera is fixed separately from the base unit.

In accordance with this arrangement, the camera is fixed separately from the base unit, and the fixing position of the camera unit is set freely.

In accordance with a preferred embodiment of the invention, the fixing means possesses a portion utilizing the suction force of a suction-cup member and including a part of the optical system of the image input means. The fixing and unfixing of the image input means is facilitated by utilizing the suction force of the suction-cup member.

In accordance with a preferred embodiment of the invention, the fixing means comprises a sucker which adsorbs the camera unit. This facilitates attachment and detachment of the camera unit.

In accordance with a preferred embodiment of the invention, the fixing means comprises an adhesive which adheres the camera unit. The adhesive applies a pressure to the information processing device that is less than that of the sucker. Therefore, if the device includes a touch panel, the touch panel will not be caused to operate properly.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 14A is a block diagram showing the construction of an interface according to the second embodiment;

FIG. 14B is a table showing the contents of command/status register used in a second embodiment;

FIG. 14C is a table showing the contents of command/status register used in the second embodiment;

FIG. 21 is a functional block diagram of the PC card according to the third embodiment;

FIG. 28B is a diagram for describing a method of using switches in the fifth embodiment;

FIGS. 36A, 36B are diagrams showing the construction of the camera unit according to the seventh embodiment.

DESCRIPTION OF THE PREFERRED EMBODIMENTS

Preferred embodiments of the present invention will now be described with reference to the accompanying drawings.

<First Embodiment>

A first embodiment in which the present invention is applied to a PC card camera will described first.

Figure 7:
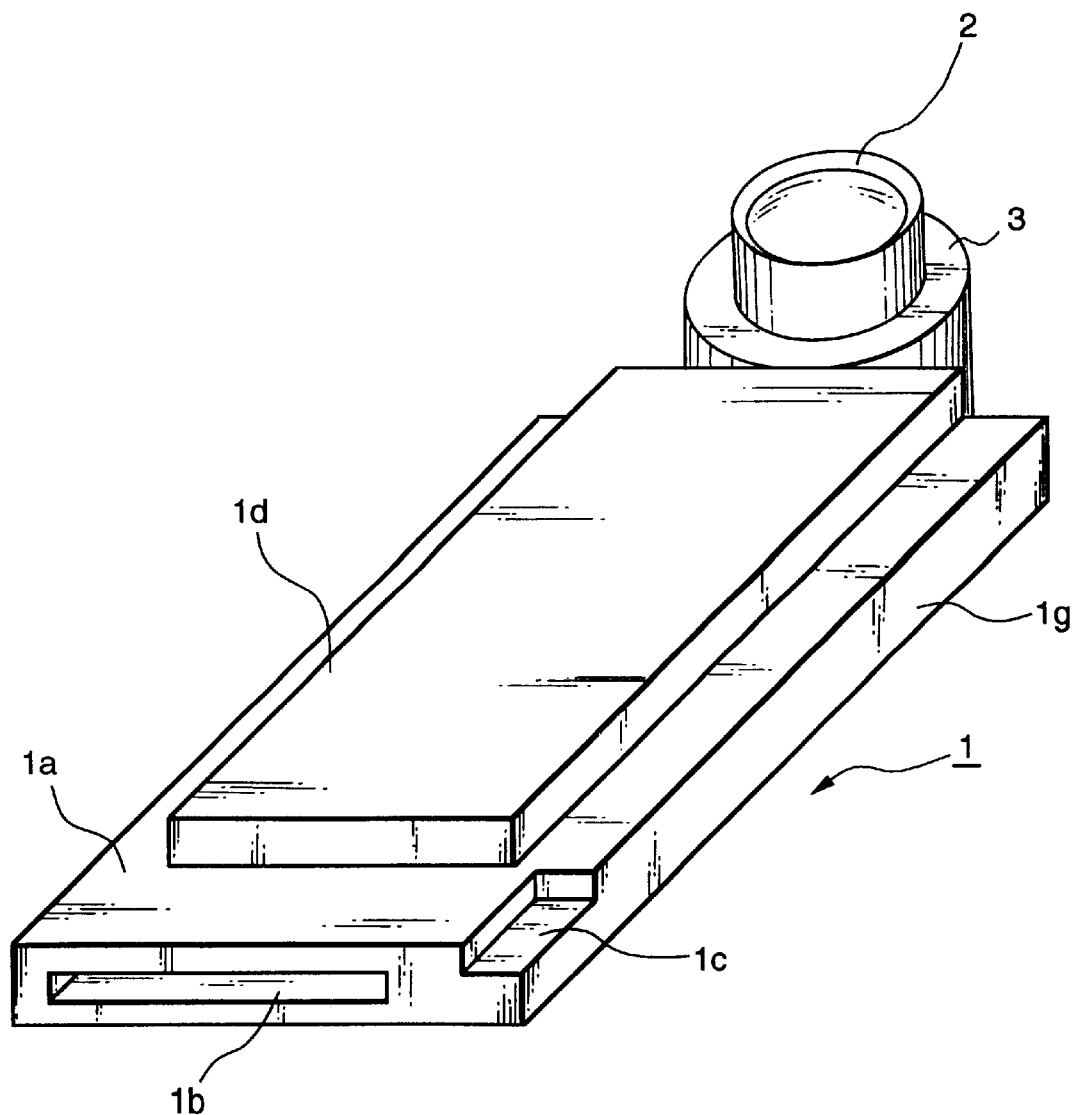
FIG. 7 is a perspective view showing the external appearance of a PC card camera serving as a first embodiment of the present invention.

FIG. 7 is a perspective view showing the external appearance of a PC card camera serving as a first embodiment of the present invention. Numeral 1 denotes a PC card camera according to this embodiment, which is characterized in that a miniature video camera is mounted on a PC card used upon being connected to a personal computer. When the PC card, which is standardized as a PCMCIA (Personal Computer Memory Card International Association) card, is connected to a personal computer, DC power is supplied to the PC card from the side of the personal computer. Accordingly, when the video camera is mounted on the PC card, the necessary power is supplied from the personal computer. This means that it is possible to realize a card-type video camera that does not require a power supply. Tables 1 and 2 illustrate the array of pins in a connector (not shown) on the PC side. This is standard for a PCMCIA card. The details are described in "JEIDAPC Card Guidelines (Ver. 4.1)", published by the Japan Electronic Industry Development Association. The standard is internationally recognized as PCMCIA 2.1.

TABLE 1

| | IC MEMORY CARD INTERFACE | | | I/O CARD INTERFACE | | |
|---|---|---|---|---|---|---|
| pin | SIGNAL NAME | I/O | FUNCTION | SIGNAL NAME | I/O | FUNCTION |
| 1 | GND | | GROUND | GND | | GROUND |
| 2 | D3 | I/O | DATA 3 | D3 | I/O | DATA 3 |
| 3 | D4 | I/O | DATA 4 | D4 | I/O | DATA 4 |
| 4 | D5 | I/O | DATA 5 | D5 | I/O | DATA 5 |
| 5 | D6 | I/O | DATA 6 | D6 | I/O | DATA 6 |
| 6 | D7 | I/O | DATA 7 | D7 | I/O | DATA 7 |
| 7 | −CE1 | I/O | CARD ENABLE | −CE1 | I | CARD ENABLE |
| 8 | A10 | I | ADDRESS 10 | A10 | I | ADDRESS 10 |
| 9 | −OE | I | OUTPUT ENABLE | −OE | I | OUTPUT ENABLE |
| 10 | A11 | I | ADDRESS 11 | A11 | I | ADDRESS 11 |
| 11 | A9 | I | ADDRESS 9 | A9 | I | ADDRESS 9 |
| 12 | A8 | I | ADDRESS 8 | A8 | I | ADDRESS 8 |
| 13 | A13 | I | ADDRESS 13 | A13 | I | ADDRESS 13 |
| 14 | A14 | I | ADDRESS 14 | A14 | I | ADDRESS 14 |
| 15 | −WE/−PGM | I | WRITE ENABLE | −WE/−PGM | I | WRITE ENABLE |
| 16 | +RDY/−BSY | O | READY/BUSY | −IREQ | O | INTERRUPT REQUEST |
| 17 | VCC | | OPERATING POWER SUPPLY | VCC | | OPERATING POWER SUPPLY |
| 18 | VPP1 | | PROGRAM POWER SUPPLY | VPP1 | | PROGRAM POWER SUPPLY |
| 19 | A16 | I | ADDRESS 16 | A16 | I | ADDRESS 16 |
| 20 | A15 | I | ADDRESS 15 | A15 | I | ADDRESS 15 |
| 21 | A12 | I | ADDRESS 12 | A12 | I | ADDRESS 12 |
| 22 | A7 | I | ADDRESS 7 | A7 | I | ADDRESS 7 |
| 23 | A6 | I | ADDRESS 6 | A6 | I | ADDRESS 6 |
| 24 | A5 | I | ADDRESS 5 | A5 | I | ADDRESS 5 |
| 25 | A4 | I | ADDRESS 4 | A4 | I | ADDRESS 4 |
| 26 | A3 | I | ADDRESS 3 | A3 | I | ADDRESS 3 |
| 27 | A2 | I | ADDRESS 2 | A2 | I | ADDRESS 2 |
| 28 | A1 | I | ADDRESS 1 | A1 | I | ADDRESS 1 |
| 29 | A0 | I | ADDRESS 0 | A0 | I | ADDRESS 0 |
| 30 | D0 | I/O | DATA 0 | D0 | I/O | DATA 0 |
| 31 | D1 | I/O | DATA 1 | D1 | I/O | DATA 1 |
| 32 | D2 | I/O | DATA 2 | D2 | I/O | DATA 2 |
| 33 | +WP | O | WRITE PROTECT | −IOIS15 | O | 15-BIT I/O PORT |
| 34 | GND | | GROUND | GND | | GROUND |

TABLE 2

| | IC MEMORY CARD INTERFACE | | | I/O CARD INTERFACE | | |
|---|---|---|---|---|---|---|
| pin | SIGNAL NAME | I/O | FUNCTION | SIGNAL NAME | I/O | FUNCTION |
| 35 | GND | | GROUND | GND | | GROUND |
| 36 | −CD1 | O | CARD DETECT | −CD1 | O | CARD DEFECT |
| 37 | D11 | I/O | DATA 11 | D11 | I/O | DATA 11 |
| 38 | D12 | I/O | DATA 12 | D12 | I/O | DATA 12 |
| 39 | D13 | I/O | DATA 13 | D13 | I/O | DATA 13 |
| 40 | D14 | I/O | DATA 14 | D14 | I/O | DATA 14 |
| 41 | D15 | I/O | DATA 15 | D15 | I/O | DATA 15 |
| 42 | −CE2 | I | CARD ENABLE | −CE2 | I | CARD ENABLE |
| 43 | RFSH | I | REFRESH | RFSH | I | REFRESH |
| 44 | RFU | | RESERVED | −I/ORD | I | I/O READ |
| 45 | RFU | | RESERVED | −I/OWR | I | I/O READ |
| 46 | A17 | I | ADDRESS 17 | A17 | I | ADDRESS 17 |
| 47 | A18 | I | ADDRESS 18 | A18 | I | ADDRESS 18 |
| 48 | A19 | I | ADDRESS 19 | A19 | I | ADDRESS 19 |
| 49 | S20 | I | ADDRESS 20 | S20 | I | ADDRESS 20 |
| 50 | A21 | I | ADDRESS 21 | A21 | I | ADDRESS 21 |
| 51 | VCC | | OPERATING POWER SUPPLY | VCC | | OPERATING POWER SUPPLY |
| 52 | VPP2 | | PROGRAM POWER SUPPLY | VPP2 | | PROGRAM POWER SUPPLY & PERIPHERAL POWER SUPPLY |
| 53 | A22 | I | ADDRESS 22 | A22 | I | ADDRESS 22 |
| 54 | A23 | I | ADDRESS 23 | A23 | I | ADDRESS 23 |
| 55 | A24 | I | ADDRESS 24 | A24 | I | ADDRESS 24 |
| 56 | A25 | I | ADDRESS 25 | A25 | I | ADDRESS 25 |
| 57 | RFU | | RESERVED | RFU | | RESERVED |
| 58 | +RESET | I | RESET | +RESET | I | RESET |

TABLE 2-continued

| | IC MEMORY CARD INTERFACE | | | I/O CARD INTERFACE | | |
|---|---|---|---|---|---|---|
| pin | SIGNAL NAME | I/O | FUNCTION | SIGNAL NAME | I/O | FUNCTION |
| 59 | −WAIT | O | WAIT | −WAIT | O | WAIT |
| 60 | RFU | | RESERVED | −INPACK | O | INPUT RESPONSE |
| 61 | −REG | I | ATTRIBUTE MEMORY SPACE | −REG | I | ABSOLUTE MEMORY SPACE SELECT |
| 62 | BVD2 | O | BATTERY POWER DETECT | −SPKR | O | DIGITAL AUDIO SIGNAL |
| 63 | BVD1 | O | BATTERY POWER DETECT | −STSCHG | O | CARD STATUS CHANGE |
| 64 | D8 | I/O | DATA 8 | D8 | I/O | DATA 8 |
| 65 | D9 | I/O | DATA 9 | D9 | I/O | DATA 9 |
| 66 | D10 | I/O | DATA 10 | D10 | I/O | DATA 10 |
| 67 | −CD2 | O | CARD DETECT | −CD2 | O | DATA DETECT |
| 68 | GND | | GROUND | GND | | GROUND |

In FIG. 7, numeral 1a denotes a guide for when the card body 1g is inserted into personal computer, scribed later. Numeral 1b denotes a connector for connecting the PC card body 1g to the personal computer. By being connected to the personal computer, the connector 1b forms a path for supplying the PC card camera 1 with power and a path for electric signals sent and received. Numeral 1c designates a cut-out which, when the PC card body 1g is connected to the personal computer, prevents the PC card body 1g from being connected in the wrong direction. Numeral id denotes a base provided on the PC card camera 1. The base id internally accommodates a control circuit for controlling a video camera unit 2, described later, an image-signal processing circuit for processing an image signal outputted by the video camera unit 2, an ID signal circuit and a configuration signal circuit.

The video camera unit 2 has an optical lens unit and an area sensor comprising a photoelectric converting-type solid-state image sensing device. Numeral 3 denotes a universal joint for holding the video camera unit 2 on the PC card body 1g in such a manner that the angular position thereof can be adjusted freely.

The PC card camera 1 can be connected to a personal computer or to a portable information device such as a personal digital assistant.

Figure 8:
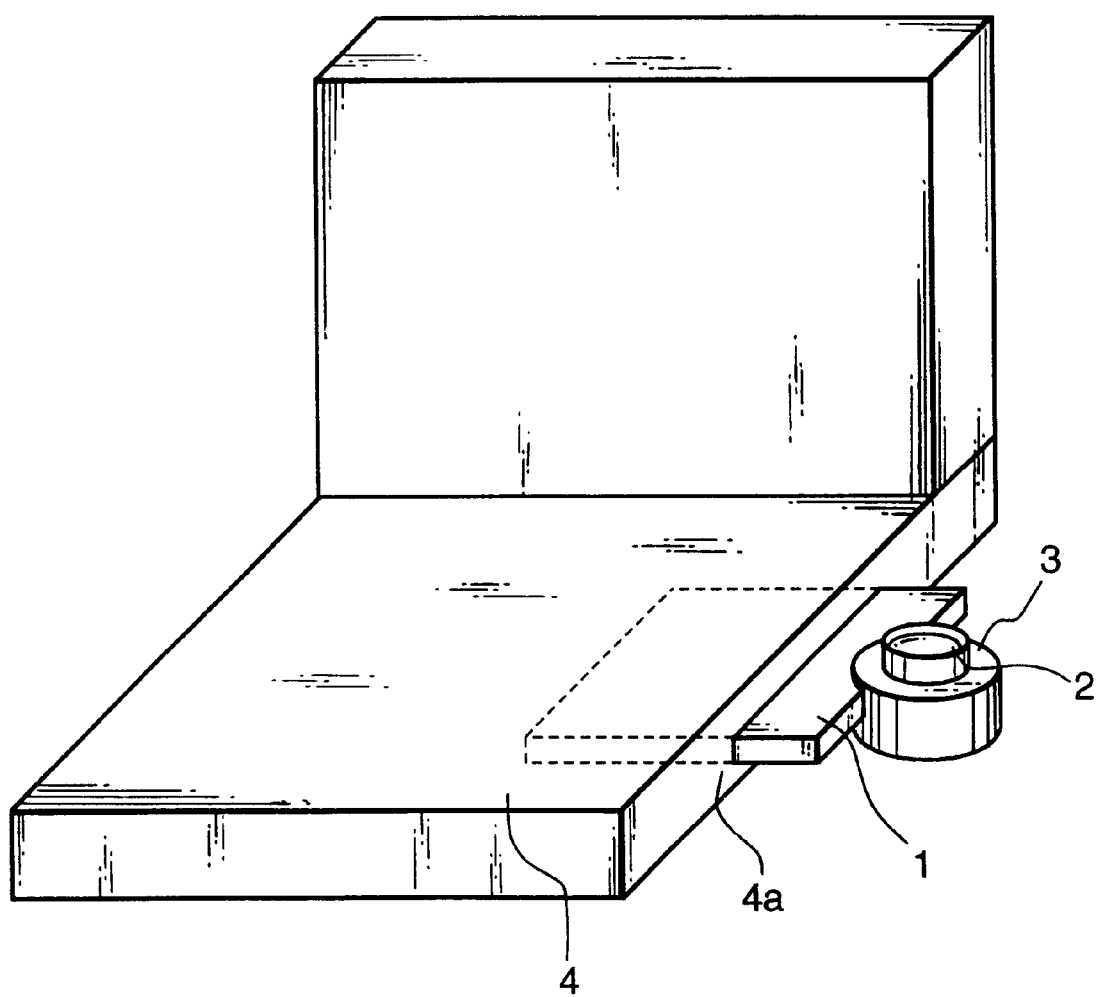
FIG. 8 is an explanatory view showing a state in which a PC card camera is connected to a personal computer.

FIG. 8 is an explanatory view showing a state in which the PC card camera 1 is connected to a personal computer. Numeral 4 denotes a notebook-type personal computer, which has a slot 4a provided in its side for the purpose of connecting the PC card. The PC card camera 1 is connected to the slot 4a.

Figure 9:
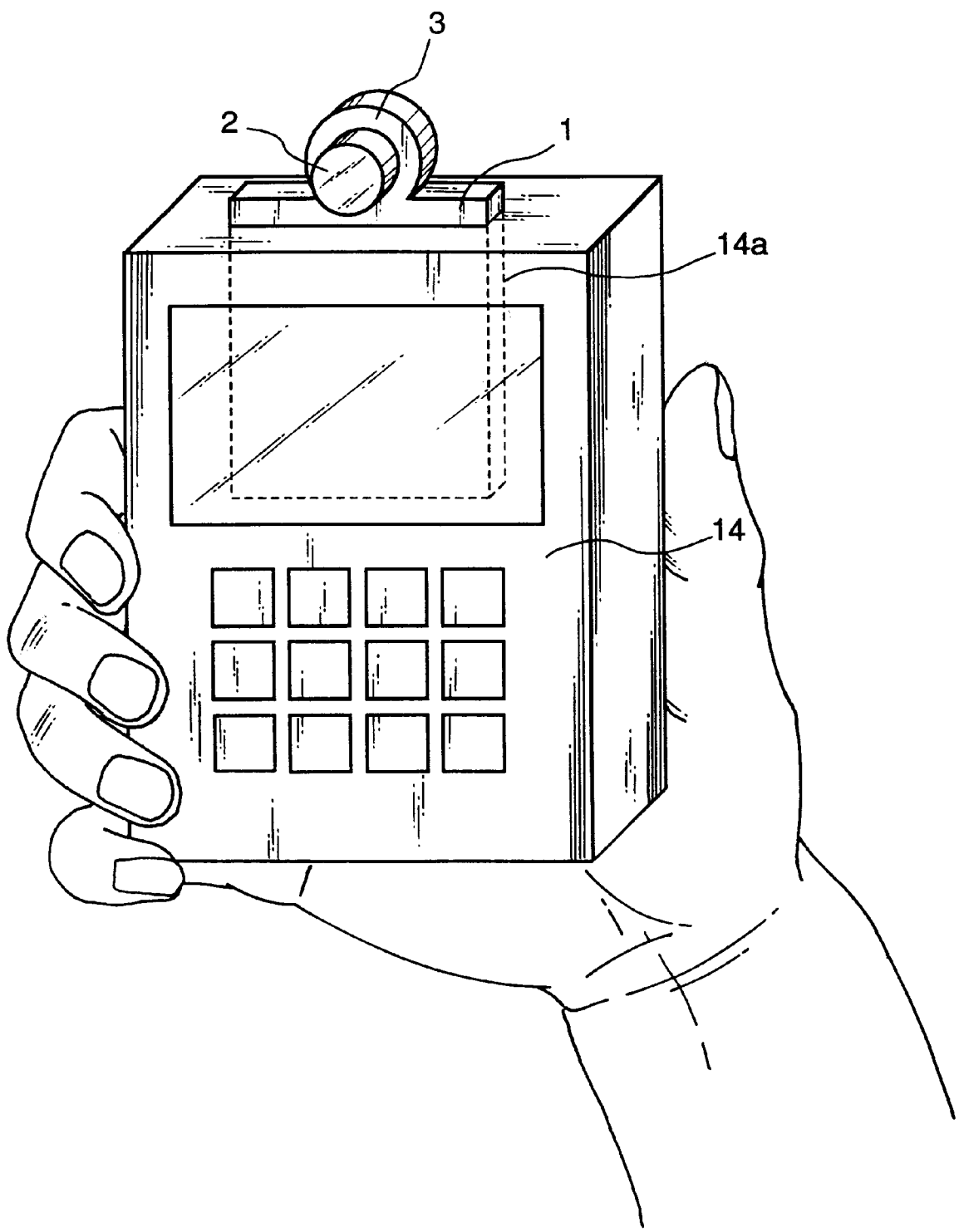
FIG. 9 is an explanatory view showing a state in which the PC card camera is connected to a portable information device.

FIG. 9 is an explanatory view showing a state in which the PC card camera 1 is connected to a personal digital assistant. Numeral 14 denotes the personal digital assistant, which is provided with a slot 14a for connecting the PC card camera 1. The PC card camera 1 is connected to the slot 14a in the same manner as illustrated in FIG. 8.

The operation and functions of the PC card camera 1 will be described next. When the PC card camera 1 is inserted into the slot 4a of the personal computer 4 as shown in FIG. 8, the connector 1b of the PC card camera 1 is connected to the connector (not shown) of the personal computer 4 in a state in which the video camera unit 2 and universal joint 3 are exposed.

When the PC card camera 1 receives a supply of power from the personal computer 4 via the connector 1b (Pin Nos. 15, 51), the PC card camera 1 sends an ID signal and a configuration signal to the personal computer. Upon receiving these signals, the personal computer 4 is capable of recognizing the output signal of the PC card camera 1 as a prescribed image signal. An image accepted by an operation command from the personal computer can be displayed on a display screen, it can be saved in memory in the form of a file or it can be sent to another personal computer connected via a line.

Since the video camera unit 2 is supported by the universal joint 3 in such a manner that its angular position is freely adjustable, an image having the optimum angle can be read in by angularly adjusting the lens of the video camera unit 2 with one's finger. For example, when a photographic image of the face of the operator of the personal computer 4 is entered, the position of the camera relative to the operator differs depending upon where the PC card camera is connected to the personal computer. This makes it necessary to adjust the optimum angle.

Figure 10:
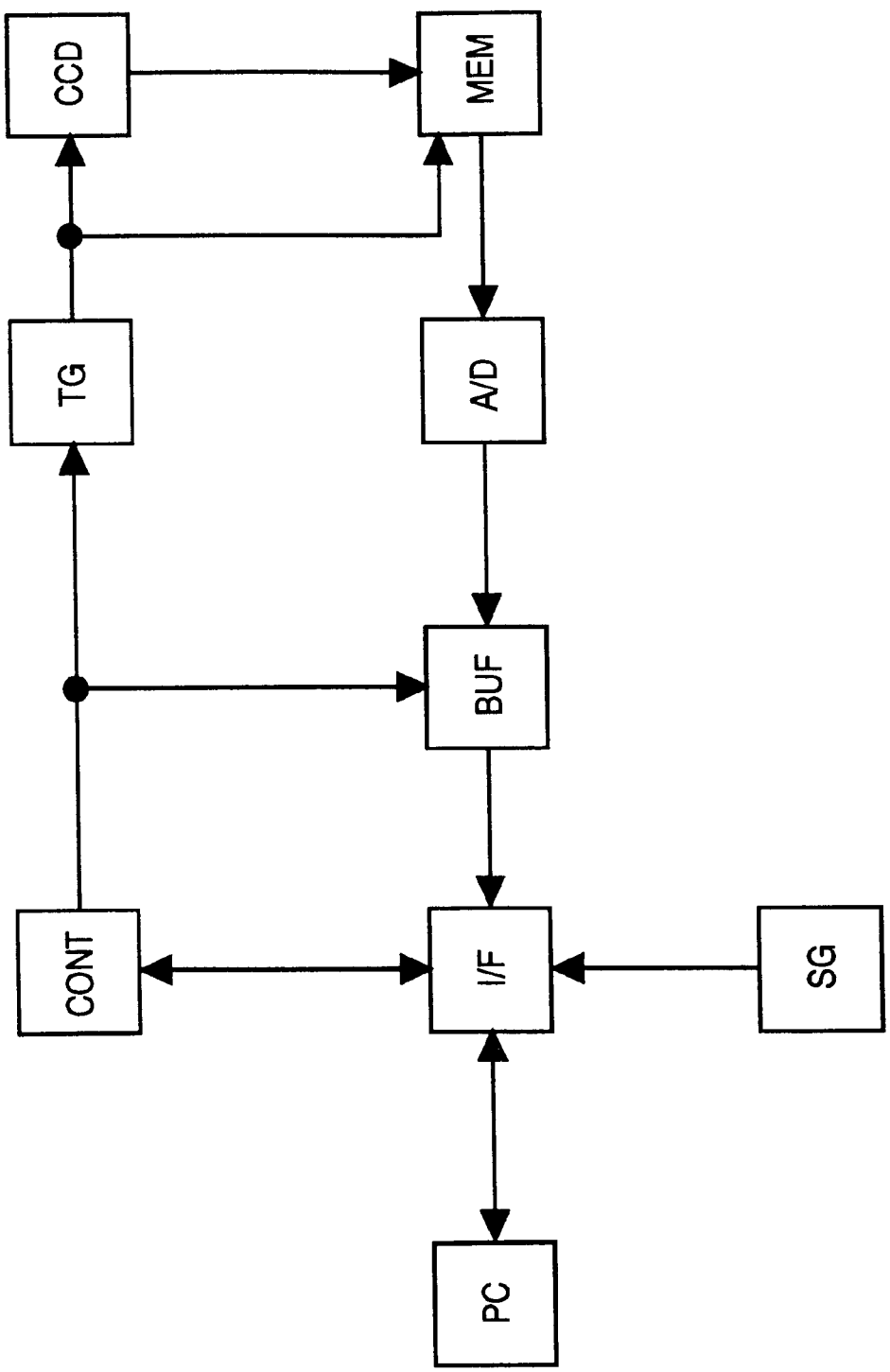
FIG. 10 is a block diagram showing the flow of signals in a case where the PC card camera is used as a video camera upon being connected to a personal computer or portable information device.

FIG. 10 is a block diagram showing the flow of signals in a case where the PC card camera 1 is used as a video camera upon being connected to the personal digital assistant. In FIG. 10, PC represents the personal computer. The other blocks indicate the various functions of the PC card camera 1. Specifically, I/F represents an interface for interfacing the personal computer, i.e., for the sending and receiving of the ID signal, configuration signal, control signal and image signal between the video camera unit 2 and the personal computer 4. SG denotes a circuit which sends the ID number of the video camera unit 2 and the configuration signal to the personal computer 4. CONT is a control circuit, TG a timing generator, CCD a photoelectric converting-type solid-state area sensor, MEM a memory for the sensor signal, A/D an analog/digital converter and BUF an image buffer circuit.

The operation of the PC card camera 1 will now be described. When the interface I/F of the PC card camera 1 is connected to the personal computer PC, a card controller on the side of the personal computer PC reads the ID signal of the PC card camera 1 out of the circuit SG. When the personal computer 4 reads out the ID signal from the circuit SG and the settings of the card camera indicated in the configuration signal, the personal computer 4 determines whether the connected PC card camera 1 is a video camera and reads in attributes of the image information, such as whether the image is monochromatic or color, the number of pixels horizontally, the number of pixel vertically and the number of grays, etc.

Next, when an operation command for operating the personal computer 4 enters the controller CONT, the latter instructs the timing generator TG to reset the sensor CCD, designate the storage time and perform a signal transfer from the sensor CCD to the memory MEM. The signal stored in the memory MEM is sent to the A/D converter A/D in response to the indication from the timing generator TG, the signal is converted to a digital signal having the prescribed gray level, and the digital signal is transferred to the image buffer BUF. The digital image signal in the image buffer BUF is sent to the personal computer PC via the interface I/F in response to the indication from the controller CONT, and the digital signal is displayed, saved as a file or transferred to another personal computer (not shown).

Figure 11:
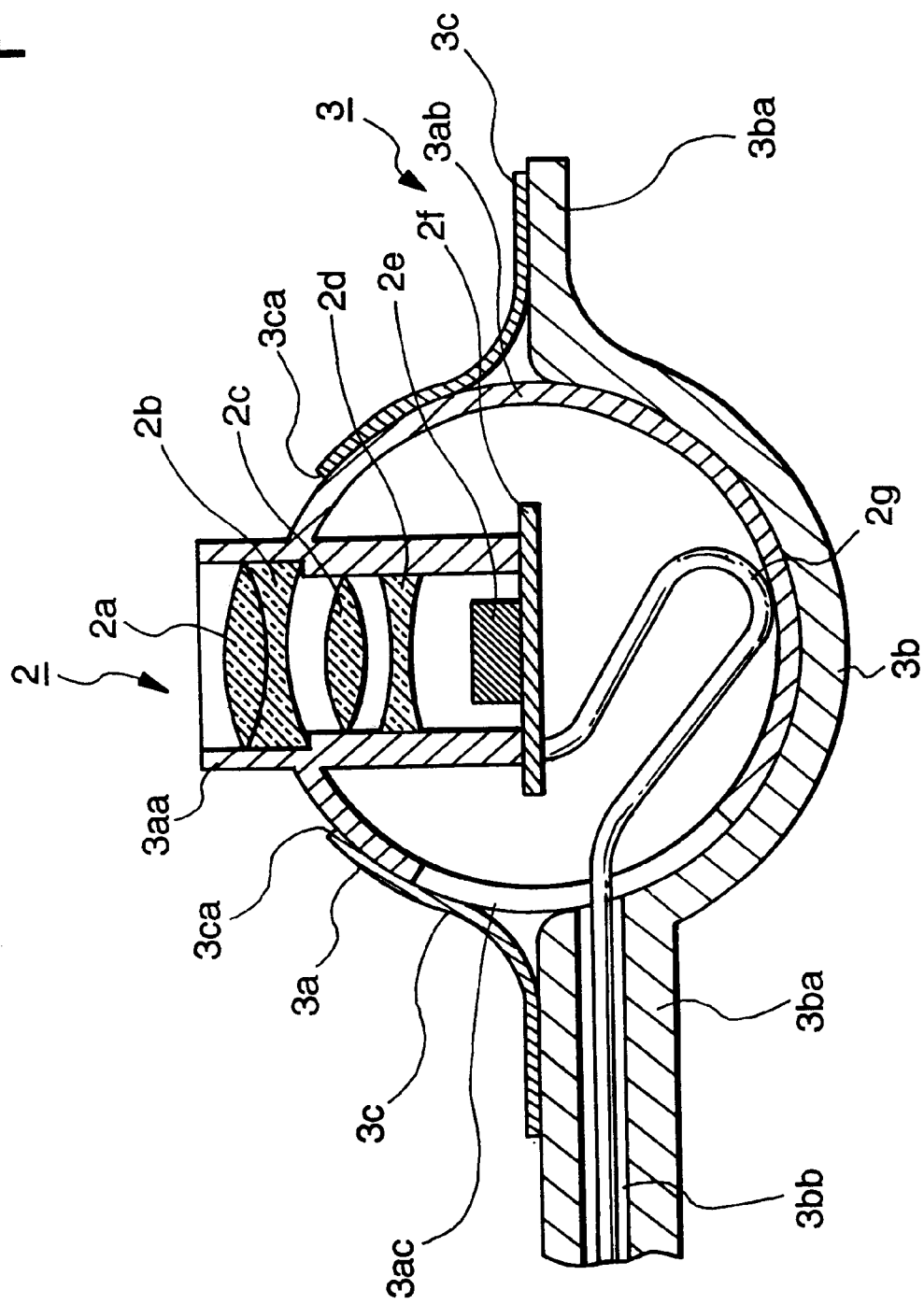
FIG. 11 is a sectional view showing the structure of a universal joint.

FIG. 11 is a sectional view showing the structure of the universal joint 3. As shown in FIG. 11, the universal joint 3 includes four optical lenses 2a, 2b, 3c and 2e, an area sensor 2e, a board 2f on which the area sensor 2e has been mounted, and a flexible lead wire 2g connected to the board 2f for making a connection to the image signal processing circuit in the base of the PC card camera 1. A housing 3a for the video camera unit 2 comprises a lens barrel 3aa holding the lenses 2a, 2b, 2c, 2d, and a spherical portion 3ab. An opening 3ac is provided part of the spherical portion 3ab.

Numeral 3b is a seat on the stationary side of the universal joint 3 freely rotatably supporting the spherical portion 3ab of the housing 3a. One side of the seat 3b is connected to the base id of the PC card camera 1 by means not illustrated. The interior of a flat plate-shaped portion 3ba is provided with an opening 3bb for receiving the lead wire 2g.

Numeral 3c denotes a leaf spring secured to the flat plate-shaped portion 3ba by means not illustrated. The leaf spring 3c resiliently urges the spherical portion 3a2 of the housing 3a toward the seat 3b. The board 2f is secured to the housing 3a by means not illustrated. Numeral 3ca denotes the tip of the leaf spring 3c, which serves also as a rotation stopper of the video camera unit 2.

The functions and operation of the video camera unit 2 and universal joint 3 will be described next. The optical lens unit composed of the four single lenses 2a, 2b, 2c, 2d is a wide-angle lens which does not require positional adjustment of the focal point. The lens unit is capable of forming the image of a subject, located at a distance between infinity and 30 cm, on the area sensor 2e at a predetermined resolution.

The image signal from the area sensor 2e is sent to the image signal processing circuit, which is mounted on the base id of the PC card camera 1, via the board 2f and the flexible lead wire 2g connected to the board 2f. The spherical portion 3ab of the housing 3a of video camera unit 2 is urged resiliently against the seat 3b on the stationary side of the universal joint 3 by means of the leaf spring 3c. As a result, the lens barrel 3aa can be moved with ease upon being grasped by one's fingers.

Upon being moved, the lens barrel 3aa is held in position by frictional resistance produced by the pressing force of the leaf spring 3c. Accordingly, in the arrangement described above, the lens barrel 3aa is capable of having its angular position adjusted freely with respect to the seat 3b.

The housing 3a is provided with the opening 3ac. The flexible lead wire 2g is connected to the board 2f through the opening 3bb in the seat 3b and the opening 3ac in the housing 3a. The housing 3a can be turned freely until the outside cylinder of the lens barrel 3aa abuts against the tip 3ca of the leaf spring 3c. Accordingly, if the size of the opening 3ac is set to a size commensurate with the turning range and the flexible lead wire 2g is provided with enough slack to allow the housing to be turned within the above-mentioned range, the lead wire will not develop excessive stress and will be severed even if the lens barrel 3aa is turned within the aforesaid range. Thus, the angular position of the lens unit can be adjusted by the universal joint 3.

In accordance with the PC card camera 1 of this embodiment, it is possible to realize a miniature, light-weight and highly portable video camera that can be carried about in one's pocket, by way of example. Furthermore, by making use of the power supply of the personal computer 4, a separate power supply need not be provided. In addition, the connection to the slot 4a of the personal computer 4 can be made by a single touch. Moreover, adjustment of the image pick-up angle can be performed manually in simple fashion.

<Modification of First Embodiment>

Figure 12:
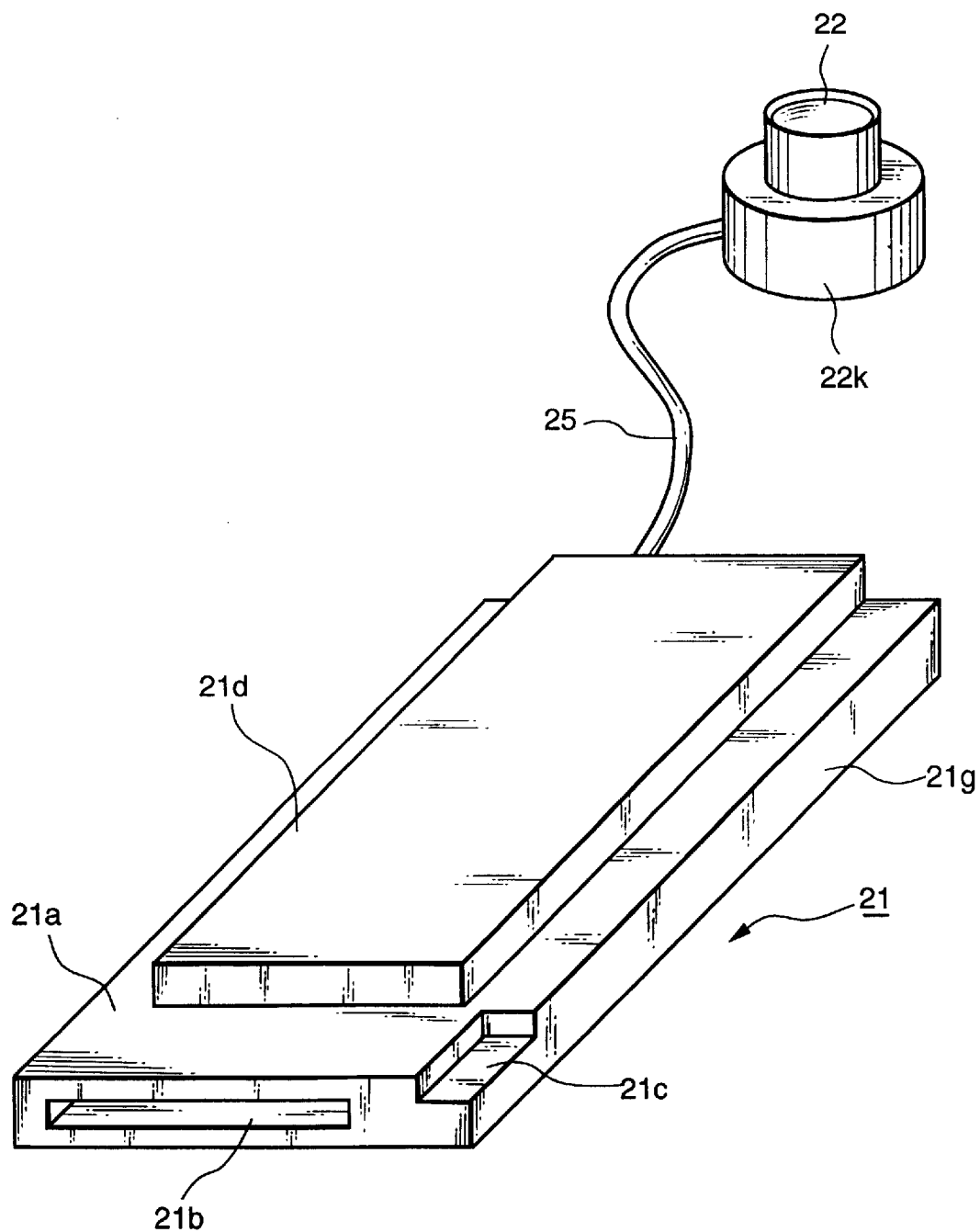
FIG. 12 is a perspective view showing the external appearance of a PC card camera according to modification of the first embodiment.

Next, a modification of the PC card camera according to the first embodiment will be described. FIG. 12 is a perspective view showing the external appearance of a PC card camera according to a modification of the first embodiment. Numeral 21 denotes a PC card camera, 22 a video camera unit and 25 a flexible lead wire. The distance and angular position of the video camera unit 22 relative to PC card body 21g can be adjusted freely.

The video camera unit 22 has a base 22k provided with a magnetic attracting plate or suction attracting plate so that the video camera unit 22 can be set at a position remote from the PC card body 21g. The flexible lead wire 25 may employ a composite tube or the like to provide a high shape-retaining capability, and the video camera unit 22 can be set up independently of the PC card camera body 21g.

<Advantages of the First Embodiment>

In accordance with the PC card camera 1 of the first embodiment, it is possible to realize a miniature, light-weight and highly portable video camera that can be carried about in one's pocket. In addition, a separate power supply need not be provided for the PC card camera. The connection to the slot 4a of the personal computer 4 can be made by a single touch, and adjustment of the image pick-up angle can be performed manually in simple fashion.

With the card camera of the above-described embodiment, the optical lens unit of the video camera unit 22 is of the wide-angle, fixed-focus type. As a result, a lens focusing mechanism can be eliminated. By using aspherical lenses, the number of lens components can be reduced.

By limiting the aspect ratio of the area sensor to a range of 1:2~1:1 and limiting the number of sensor pixels to less than 100,000 to reduce the size of the sensor itself, the load upon the image signal processing circuit is reduced, thus providing a PC card camera which is as small and as light in weight as possible. Accordingly, the optical lens unit, the sensor unit and the image signal processing unit are miniaturized, thus providing a card-size camera that can be carried about in one's pocket.

Furthermore, the angular position of the video camera unit 2 mounted on the base 1d of the PC card body 1g can be freely adjusted-with respect to the PC card body 1g, namely the personal computer on which the PC card body 1g has been mounted. Accordingly, when the PC card camera 1 is connected to the personal computer 4 and an image is read in from the camera, an image having the appropriate size and the proper image pick-up angle can be read in without moving the personal computer.

When the PC card camera 1 is connected to the personal computer 4 and the connected PC card camera 1 functions as a video camera, the card camera has a function for sending a recognizable ID signal and a configuration signal through which it is possible to discriminate the attributes of the output signal, such as whether it is a color or monochromatic signal, the aspect ratio, the number of pixels and the gray level. Accordingly, when the PC card camera 1 is connected to the personal computer 4, the ID signal and the configuration signal are sent to the side of the personal computer in response to a command from the personal computer so that the PC card camera can be operated as a video camera by plug-and-play without special driver software.

<Second Embodiment>

A second has as its object the provision of a miniature, high-performance image input unit, i.e., a camera, capable of entering a moving picture into a computer simply and inexpensively. As in the modification of the first embodiment described above, the camera portion and the main body are separate from each other and are connected by a cable.

Figure 13:
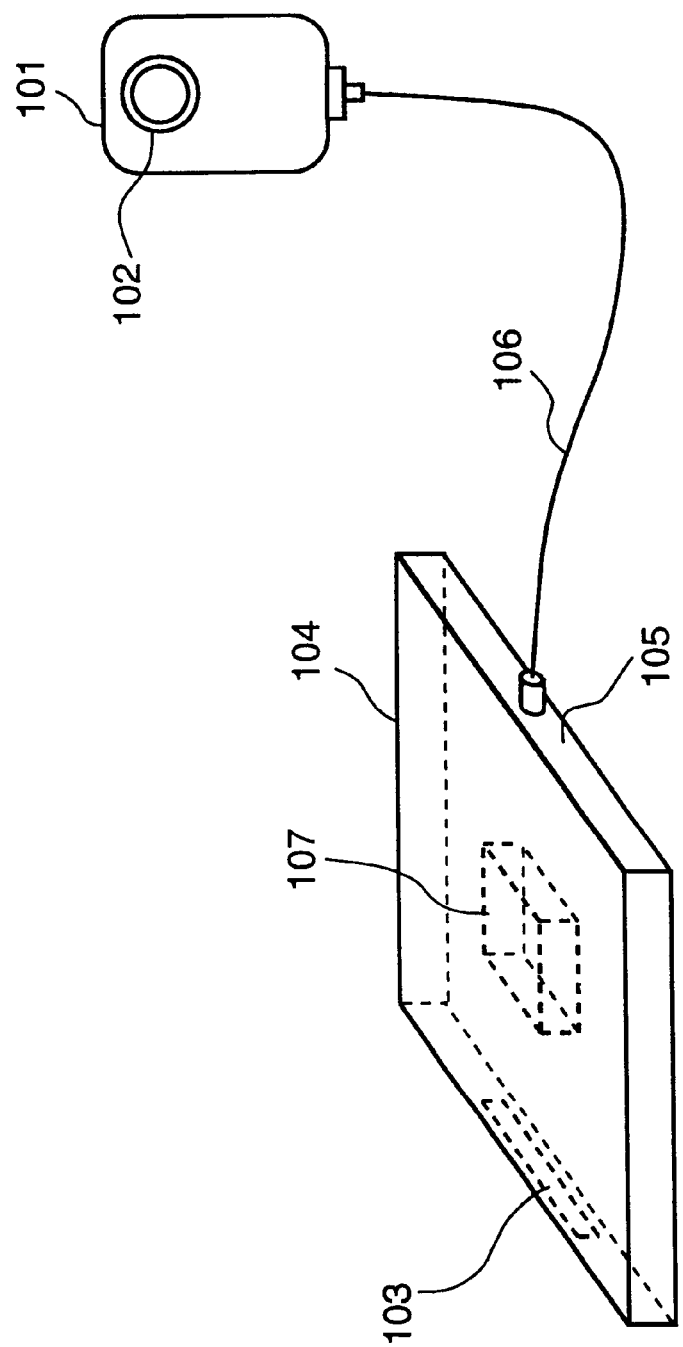
FIG. 13 is a diagram showing the arrangement of a second embodiment of the invention.

FIG. 13 is a diagram showing the arrangement of a camera for a personal computer according to a second embodiment of the invention.

In FIG. 13, numeral 101 denotes a camera head arranged so as to point toward a subject. The camera head 101 is integrated with a photographic lens 102 and a sensor element (not shown) such as a CCD or X-Y address sensor for electrically converting light from the subject to an electric signal. The light from the subject impinges upon the sensor element through the photographic lens 102.

Numeral 103 denotes a connector provided on a card-shaped base 104. The base 104 is internally provided with an interface 107 for sending an image signal to a personal computer (not shown). The base 104 is capable of being inserted into a card socket (not shown) provided in the side of the personal computer. The socket in the side of the personal computer has a connector (not shown), and the arrangement is such that this connector and the connector 103 on the base 104 can be joined.

Numeral 105 denotes a connector and 106 a cable which connects the camera head 101 and the base 104. The cable 106 is connected to the base 104 by the connector 105.

FIG. 14A is a block diagram showing the construction of the interface 107 incorporated in the card-shaped base 104. Numeral 201 in FIG. 14A denotes a connector on the side of the camera head. This connector corresponds to the connector 105 in FIG. 13. Numeral 202 denotes a timing controller which generates a clock for driving the sensor element (not shown) incorporated in the camera head 101 and a synchronizing signal necessary for reading out an image. An instruction controller 203 generates a control signal for designating the operating phase in the sensor element. An A/D converter 204 converts an analog image signal, which has been obtained from the sensor element, into a digital signal. A ROM 205 stores the attribute information of the card. Numeral 206 denotes a command register for receiving instructions from the personal computer and a status register which indicates the status of the card. A FIFO-type memory 207 temporarily stores the image data that has been converted to digital data by the A/D converter 204. Numeral 208 denotes an address/data bus, and numeral 209 designates a connector on the side of the personal computer. This corresponds to the connector 103 in FIG. 13.

Figure 15:
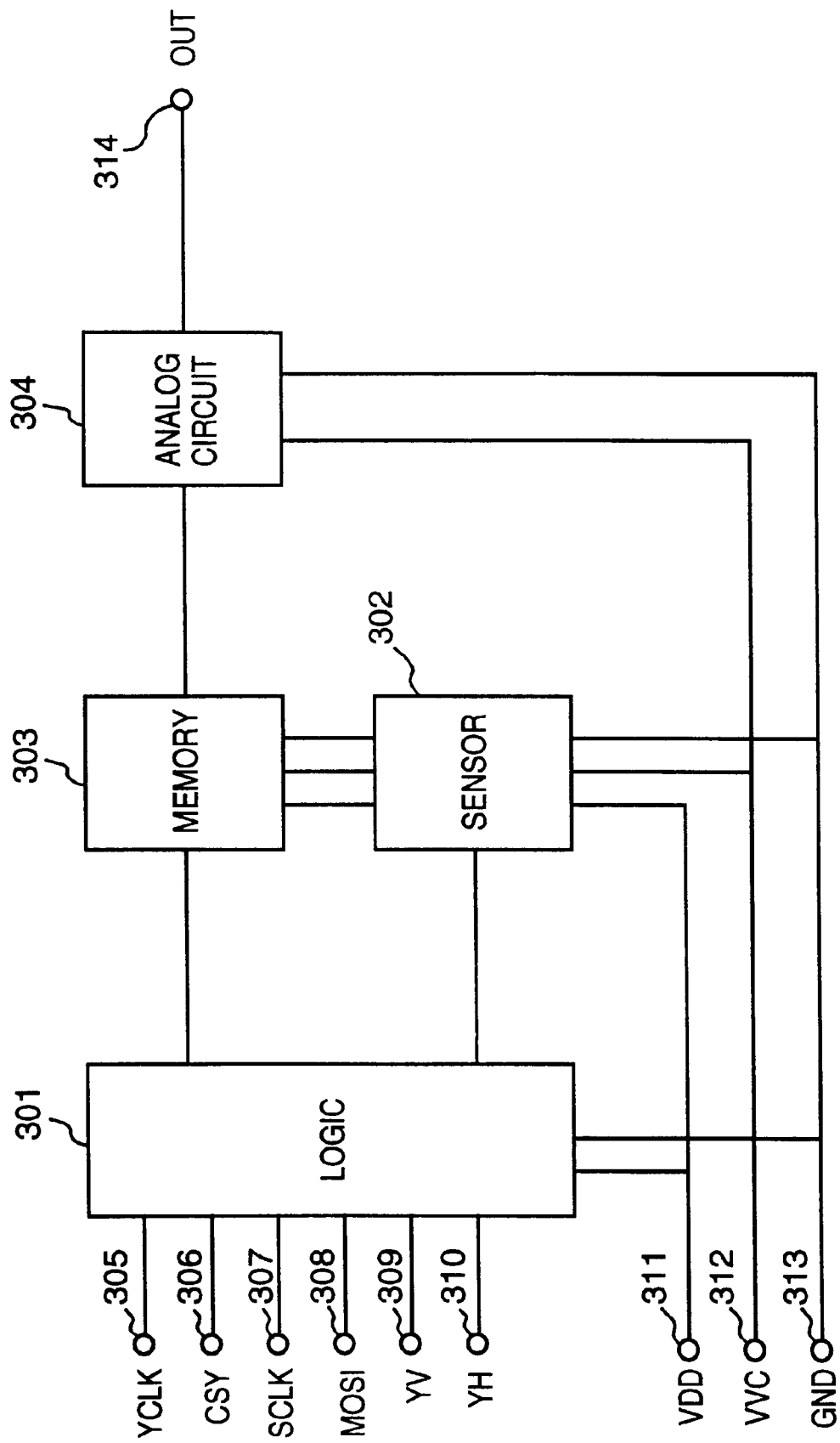
FIG. 15 is a block diagram showing the construction of a camera head according to the second embodiment.

FIG. 15 is a block diagram showing the construction of the camera head 101. This illustrates the constitution of the internal area sensor element. A logic unit 301 receives externally applied drive pulses and generates timing pulses necessary for operation. Numeral 302 denotes a sensor serving as a photoelectric transducer, 303 a memory for storing the electric charge obtained by the sensor 302, and 304 an analog circuit such as an amplifier for entering the potential from the memory 303.

Further, numeral 305 denotes a terminal which supplies the logic unit 301 with a clock YCLK, and numerals 306, 307, 308 designate synchronous-type serial-communication terminals for sending operation commands to the logic unit 301. The terminals 306, 307 and 308 are for a chip-select signal CSY, a communication clock signal SCLK and a data-line signal MOSI. Numeral 309 denotes the input terminal of a clock signal YV for transfer of a vertical-line shift transistor in the area sensor, numeral 310 denotes the input terminal of a clock signal YH for transfer of a horizontal-line shift transistor in the area sensor, numeral 312 denotes the terminal of a reference power supply VVC for analog operation, and number 313 designates a ground terminal. Numeral 314 denotes an analog-signal output terminal. The cable 106 inputs/outputs signals on the terminals 305~314 to and from the card-shaped base 104.

Tables 1 and 2 for the first embodiment illustrate the pin arrays of the connector 209 on the side of the personal computer.

Figure 16:
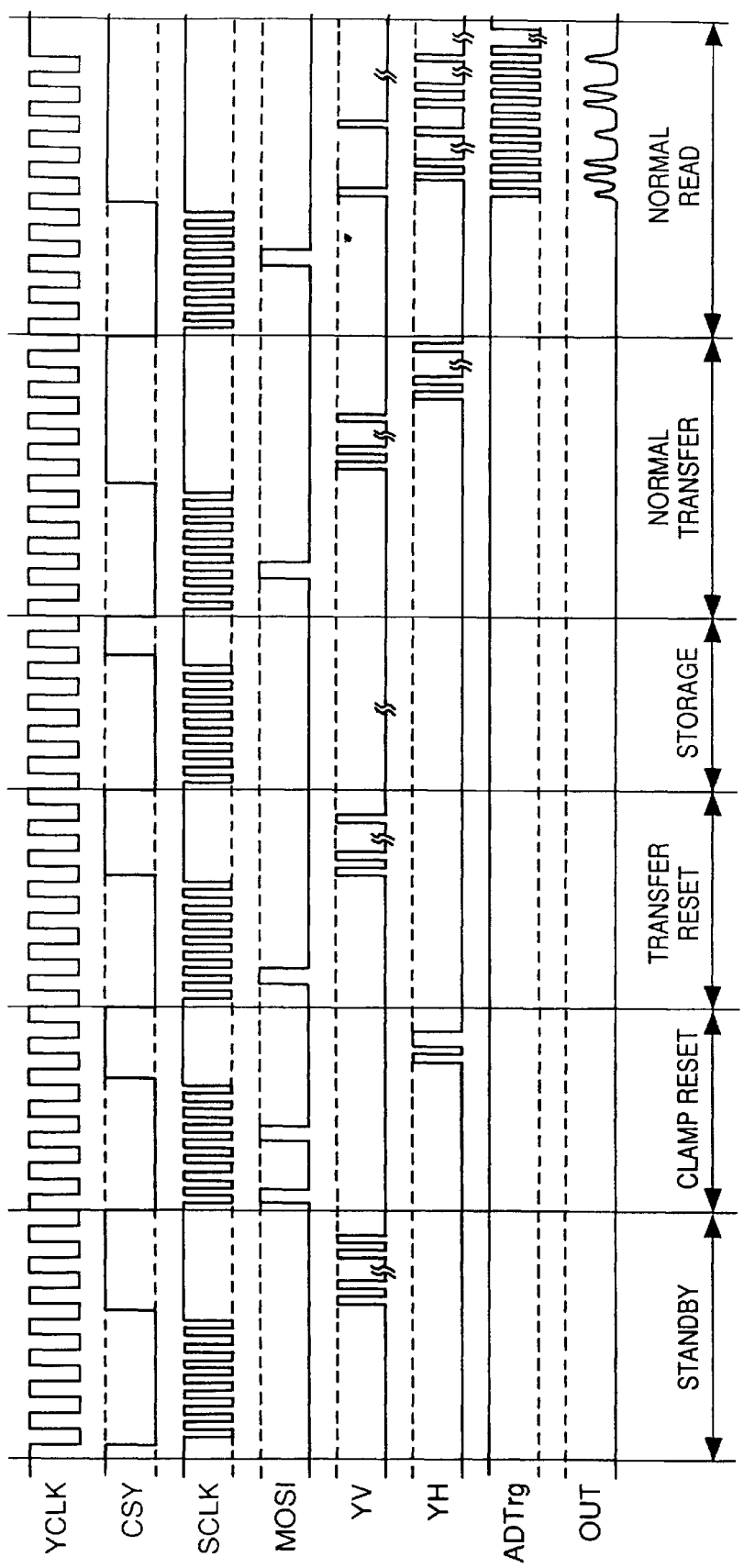
FIG. 16 is a timing chart showing the operation of a sensor unit according to the second embodiment.

The operation of the above-mentioned area sensor will be described using the pulse timing chart of FIG. 16. The clock YCLK on terminal 305 in FIG. 15 decides the basic operation of the logic unit 301 and is outputted at all times. In the standby phase, data ("0") indicative of this phase is transmitted through the serial-data line MOSI in conformity with the communication clock SCLK.

The transfer clock YV for the vertical-line shift register is generated for the number of pixels in the vertical direction, whereupon the logic unit 301 is reset. In the clamp reset phase, a constant bias potential is applied to all sensors, then sensors are reset successively in units of one line in the horizontal direction in the ensuing transfer reset phase. At this time one YV pulse acts upon the pixels of one line. Immediately after this operation, light incident upon each sensor starts to appear as the potential of the sensor element.

During the storage phase, the light incident upon the sensor causes the potential within the sensor to rise in proportion to the amount of this incident light. In the normal transfer phase, the electric charge produced within the sensor is transferred to the memory 303. In the normal read phase, the charged that has accumulated in the memory 303 is read out in successive fashion. At this time one line in the horizontal direction is selected whenever one pulse of the signal YV is generated, and the electric charge is read out whenever one pulse of the signal YH is generated in the selected line.

The charge read out is delivered from the output terminal 314 through the analog circuit 304. A signal ATDrg is a signal which, when logical "1", informs of the timing at which the electric charge is outputted. This signal is multiplexed with CSY and shares the same terminal. An open drain is furnished with a pull-up resistance at the output terminal for the signal ATDrg.

Operation for a case where the aforementioned camera of this embodiment is controlled from the personal computer will now be described with reference to the flowchart of FIG. 17.

Steps S1~S3 indicate an operation performed whenever a card is newly inserted into the slot of the personal computer. Specifically, when the signal CD (Pin No. 36 in Table 2) changes from "0" to "1", the personal computer performs a resetting operation with regard to the card at step S1 [i.e., "1" logic is established at the terminal RESET (Pin No. 58)].

CIS (Card Information Structure) is read out at step S2. In this embodiment, CIS is stored beforehand in the ROM 205 shown in FIG. 14. If the CIS is indicative of the type of memory or of an I/O card, there is information such as configuration method and interrupt level. At step S3, the personal computer writes a configuration index in a CCOR (Card Configuration Option Register), whereby designation of utilizable resources such as IO base address and an interrupt number is performed on the card side based upon the CIS obtained at step S2.

The steps S4~S6 are specific to the operation of the camera of this embodiment. Theses steps represent an operation for writing data in the command/status register 206 of FIG. 14A in order to set the storage time and select the amplifier gain or amplification characteristic of the analog circuit 304.

The writing of data in the register is carried out through Pin Nos. 1~6 and 30~32 shown in Table 1. The content of the command/status register 206 shown in FIG. 14A is illustrated in FIGS. 14B and 14C. The command/status register 206 includes a control/status register and a data register, as shown in Table, 3, as well as a gain setting register and a storage-time setting register, as shown in Table 4.

The control/status register controls the operation of the camera. Each of the bits of the register will now be described. ComBusy (D7) indicates whether a command from the host is accepted; DataRDY (D6) indicates whether image readout is possible or not; 1stLine (D5) indicates the first line of one frame; FIFORSTW (D4), FIFORSTR (D3) are for controlling read reset and write reset of a FIFO for image data; INTEN (D2) is a bit for allowing output of an interrupt signal; and Start (D1) is a bit for starting image readout. With regard to D4, D3, D2, access is not possible from the host side; access is possible only from the control microcomputer.

The data register is for reading out image data; eight-bits of image data are obtained.

Next, in Table 4, the gain setting register is a register for designating the gain or amplification characteristic of the analog circuit 304. As for the gain, a linear output and a non-linear output which are increased by 5, 10, 20, 40 can be set manually or automatically., The storage-time setting register is for setting storage time in the sensor.

Figure 17:
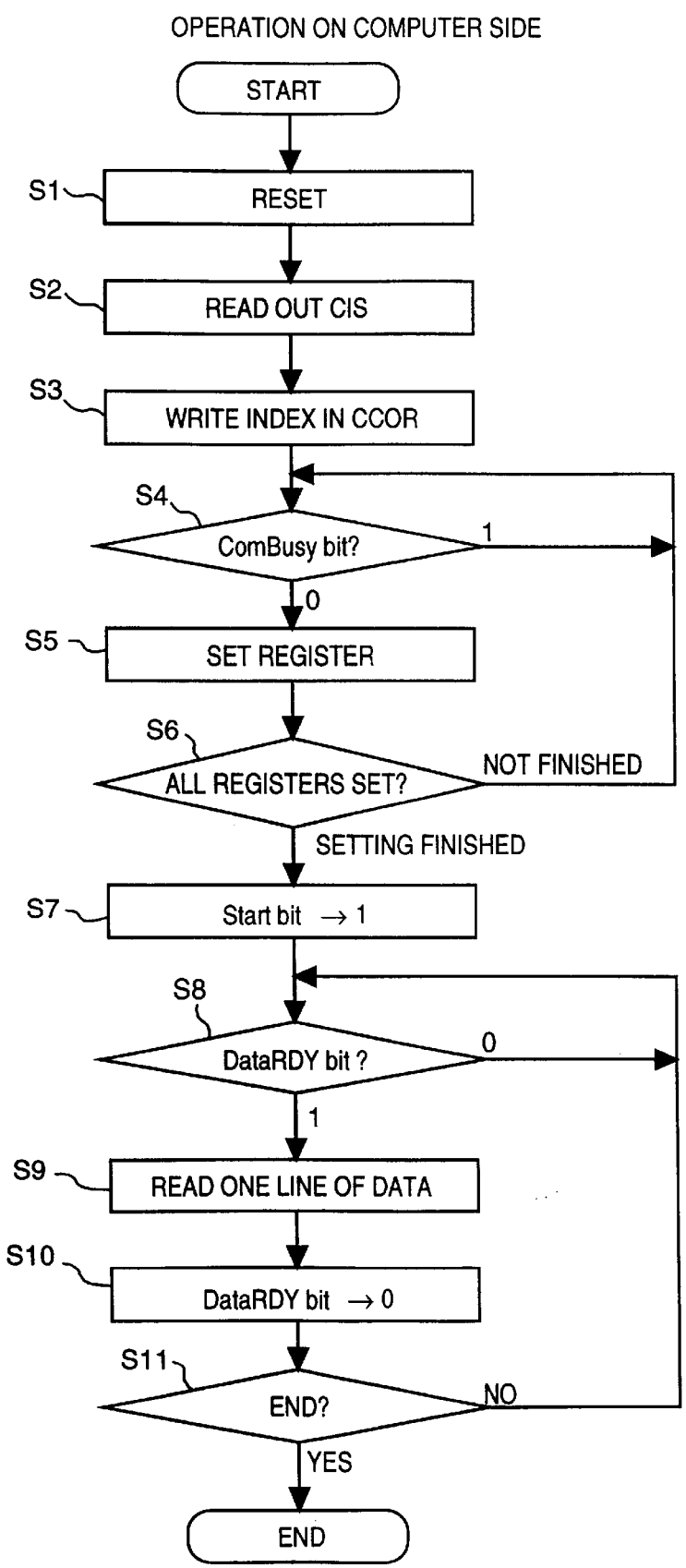
FIG. 17 is a timing chart showing operation on the side of a personal computer in the second embodiment.

At step S4 in FIG. 17, whether or not a command from the host is accepted is verified depending upon whether the ComBusy bit of D7 is "0" or "1". Next, the program proceeds to step S5, where each register is set. Steps S5, S6 are repeated until the writing of data in all registers ends. The reason for verifying that the bit of ConBusy (Pin No. 16) of status register 206 is "0" is that this signal becoming "0" means that the register 206 is capable of being accessed.

Image storage and readout are performed at steps S7~1. At the moment Startbit in the control register becomes 1, the start of the storage operation for the sensor is designated at step S7. This operation is carried out at the moment there is a transition from the standby phase to the normal transfer phase shown in the timing chart of FIG. 16. When the normal transfer ends on the sensor side, one line of normal read is performed. In order to perform this for one line, one pulse of the Yv signal is sent and then the ensuing YH signal is sent for several pixels on one line.

As a result, the image signal obtained from the output terminal 314 is converted to a digital signal by the A/D converter 204 of FIG. 14A and then the digital signal is written in the memory 207. When one line of data is written in the memory 207, the DataRDY bit of status register 206 is made "1". The control software on the side of the personal computer accepts the fact that the DataRDY bit has become "1" (step S8), one line of data is read out of the memory 207 at step S9 and the DataRDY bit is made "0" at step S10 upon the conclusion of readout. Meanwhile, the timing controller 202 outputs the next YV signal and YH signal and stores the second line of image data in the memory 207. Thereafter at the moment the DataRDY bit becomes "0", it is made "1" again. Operation is the same as set forth above from the third line onward.

The aforesaid single readout need not be performed every line. Depending upon the number of pixels of one line and the capacity of the memory 207, it is possible to perform the readout every 10 lines, by way of example. As a result, it is possible to reduce the number of times polling of the DataRDY bit is performed.

The timing controller 202 (FIG. 14) can be replaced by a pulse generating circuit and a circuit, which has a port control function, incorporated within a single-chip microcomputer. Similarly, the instruction controller 203 can be replaced by a synchronous-type serial communication circuit incorporated within a single-chip microcomputer. Further, in a case where the image size is small and the frame rate is low, the A/D converter 204 can be fully replaced by one incorporated in a single-chip microcomputer. Accordingly, the function of the interface shown in FIG. 14A can be replaced by a single LSI.

With regard to the operation of the second embodiment, the image signal carried by the cable 106 is not sent together with a synchronizing signal that is repeated at a fixed period, as in the manner of an NTSC signal. The image signal is sent from the camera head 101 in conformity with a synchronizing signal outputted from the side of the interface circuit as necessary. The interface circuit 107 converts the transmitted image signal from an analog signal to a digital signal and stores the digital signal in an image memory. On the side of the personal computer, the image signal is read through the interface.

Accordingly, a moving picture can be entered into a computer simply and inexpensively and it is possible to realize a miniature, high-performance camera for computers.

In accordance with the camera of the second embodiment, as described above, only the sensor unit is mounted on the camera head, thereby miniaturizing the camera head so that camera head will not interfere with operations even if it is placed on the monitor screen of the computer. As a result, when an application such as a television conference or TV telephone is executed, the camera can be placed near the position at which the image of the other party's face is displayed, thereby making it possible to readily achieve coincidence of line of sight.

As a result, a moving picture can be entered into a computer simply and inexpensively and it is possible to realize a high-performance camera for computers.

Further, by providing an interface located inside a card-shaped base with a register for exchanging data with a computer, a memory for storing image data, means for generating a clock, a synchronizing signal and a control signal for driving a sensor and an A/D converter for converting an analog signal from the sensor into a digital signal, the card can be inserted into and withdrawn from the computer with ease.

Furthermore, by adopting an arrangement in which the image signal from the camera head is outputted only when the synchronizing signal from the interface is generated, it is possible to dispense with the conventional NTSC-signal generating circuit.

By employing a single-chip microcomputer to realize the generating means which generates the clock, synchronizing signal and control signal for driving the sensor and the A/D converter for converting the analog signal from the sensor to a digital signal, the number of elements can be reduced and it is possible to incorporate functions having additional value by relying upon the software of the single-chip microcomputer.

By using a FIFO-type memory as the memory which stores the image data, address control is no longer necessary and the scale of the circuitry can be reduced.

<Third Embodiment>

The first and second embodiments relates to a card camera mainly for sending video. A card camera according to third and fourth embodiments sends audio as well as video.

Figure 18:
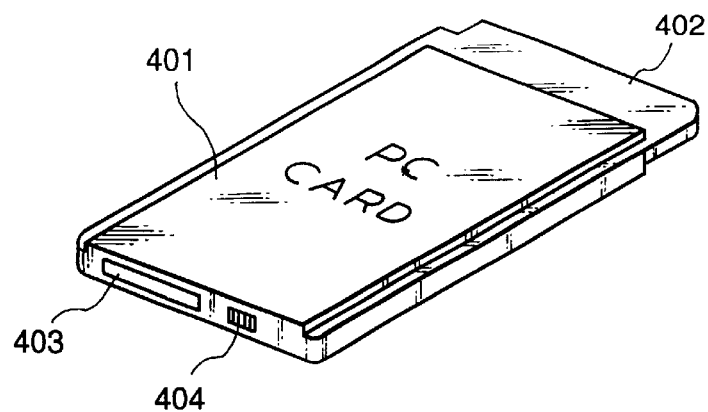
FIG. 18 is a perspective view showing the external appearance of a PC card camera according to a third embodiment.
Figure 19:
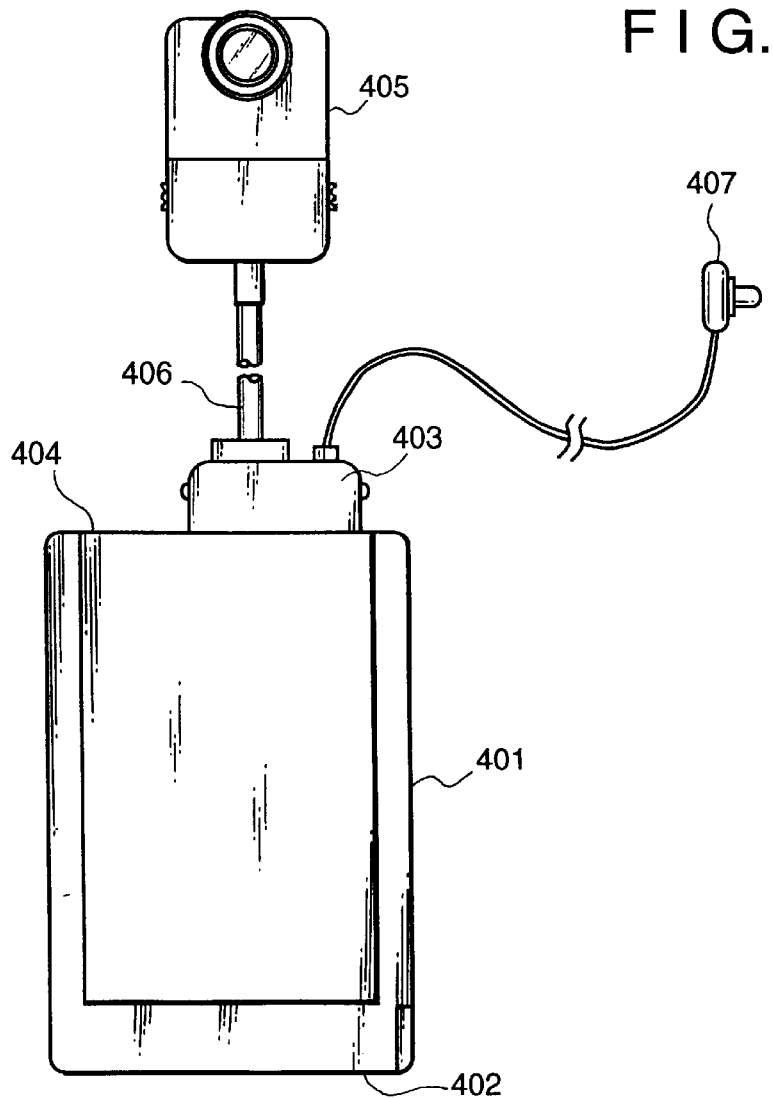
FIG. 19 is a diagram showing-the PC card of the third embodiment when a camera unit and an earphone have been connected thereto.

FIG. 18 is a perspective view showing the external appearance of a PC card 401 camera according to a third embodiment. This card is of the type in line with TYPE II of the PCMCIA specifications. FIG. 19 is a front view showing the PC card 401 of FIG. 18 when a camera unit 405 and an earphone 407 have-been connected thereto.

Figure 20B:
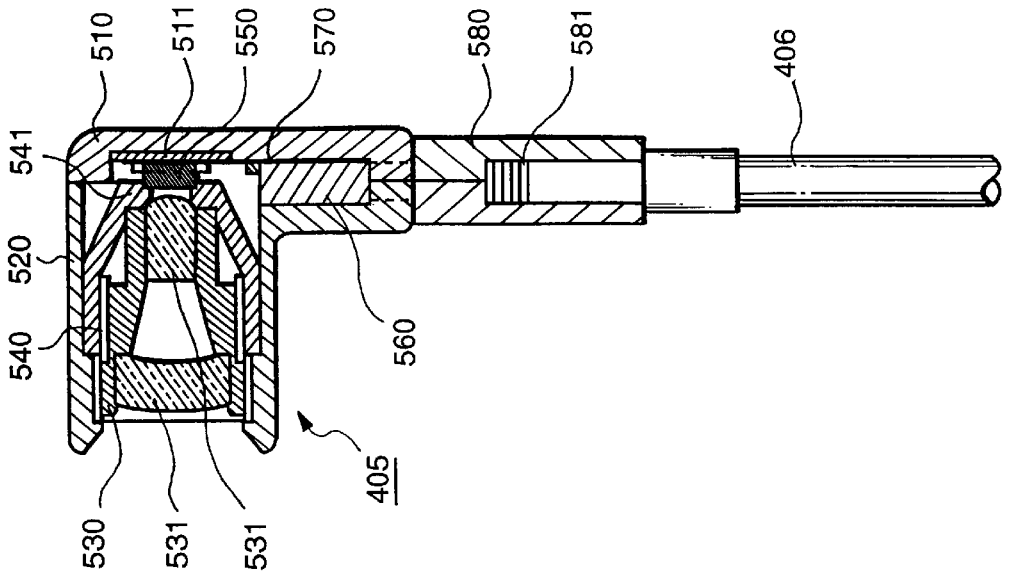
FIGS. 20A and 20B are diagrams for describing the camera unit.
Figure 20A:
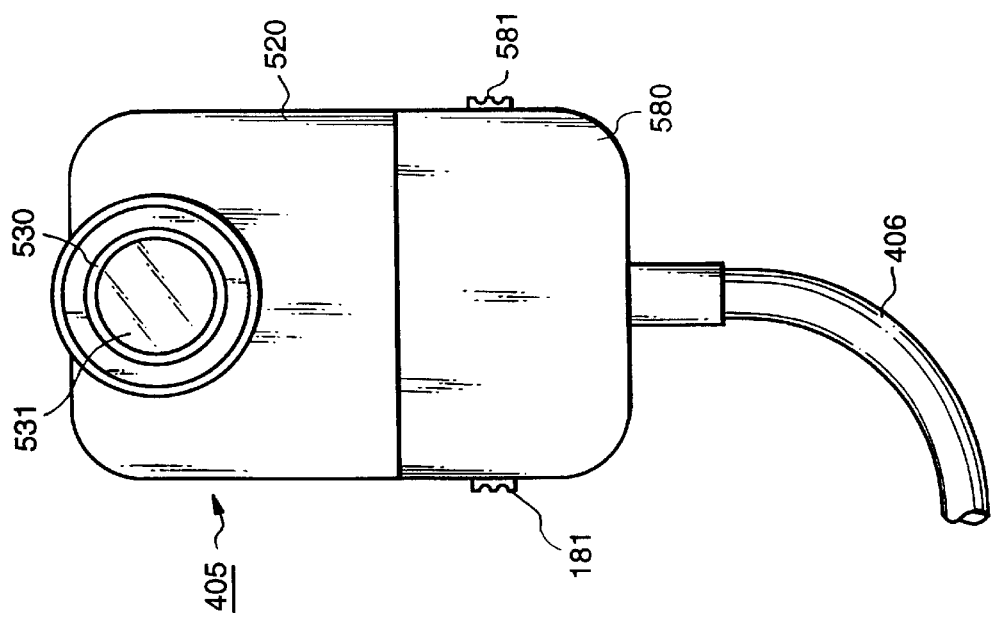

As shown in FIGS. 18 and 19, a main connecting unit 402 connects the PC card 401 to the main body of a personal computer or the like serving as a host. A connector 403 connects the camera unit 405 and the earphone 407 to the PC card 401 at one time. A microphone 404 is provided on the PC card 401 on the end face thereof opposite the main connecting unit 402. The details of the camera unit 405 are shown in FIGS. 20A and 20B. A connecting cord 406 connect the connector 403 and the camera unit 405 and transmits an image signal, clock signal and synchronizing signal. The cord 406 is a flexible cord the outer surface of which is covered with a flexible holding member of the type which allows the orientation of the camera unit 405 to be changed and fixed manually.

The details of the structure of camera unit 405 will be described with reference to FIGS. 20A and 20B, which are an external front view and a sectional view of the principal components, respectively.

Shown in FIGS. 20A and 20B are a back cover 510, a resilient member 511, a front cover 520, a lens barrel unit 530, a photographic lens group 531, a focus spacer 540, a sensor 550, a connector receptacle 560, a flexible printed circuit board 570, a connector plug 580 and an unlock button 581 for the same plug.

The lens barrel unit 530 holding the lens group 531 is threadedly engaged with the focus spacer 540 and turns relative to the spacer so that a focusing adjustment can be performed. The spacer 540 has a spot facing 541 which mates with the exterior of the package of sensor 550, which consists of a transparent plastic package. By being brought into abutting contact with the front face of the package, the spacer effects positioning along three axes.

The flexible printed circuit board 570 on which the sensor 550, the connector receptacle 560 and peripheral elements (not shown) are mounted is clamped between the front cover 520 and back cover 510 by the resilient member 511, such as a sponge or rubber sheet, disposed at the back of the sensor in the plane of the board. Thus the board is clamped in the abutting state.

By providing the back cover 510 and the front cover 520 or the flexible printed circuit board 570 itself with an elastically deformed urging member, the resilient member 511 may be eliminated.

The connector receptacle 560 that couples with the connector plug 580 is surface-mounted on the flexible printed circuit board 570 and is mechanically connected to either the front cover 520 or back cover 510 to provide mechanical strength.

FIG. 21 is a block diagram illustrating the functions of the PC card 401 according to this embodiment. The portion enclosed by the one-dot chain line is the PC card 401, which has a host interface 422 for interfacing a PC bus 421 on the side of the personal computer serving as the host. The host exchanges commands and status with the PC card 401 and reads out data as well. A controller 423 receives commands from the host, controls the operation of a timing generator 424 and CODEC 430 and controls read/write of an image buffer 425 and audio buffer 426.

A timing generator 424 performs reset control and storage-time control of the sensor 550 and signal processor/memory 428 of the camera unit 405, transfers electric charge from the sensor 550 to the signal processor/memory 428 and designates signal processing.

The image buffer 425 writes in image data after it has been converted to digital data and reads image data out of the host through the host interface 422. The audio buffer 426 writes in audio data after A/D conversion and compression, reads audio data out of the host through the host interface 422, writes in audio data from the host and delivers the data to a CODEC 430.

An image A/D converter 429 converts an analog image signal from the signal processor/memory 428 into digital data. The CODEC 430 compresses and decompresses the audio signal. A D/A converter 431 converts the digital audio data from the CODEC 430 into an analogsignal and outputs the analog signal to the earphone 407. An audio A/D converter 432 converts the analog signal from the microphone 404 into a digital data. The sensor 550 photoelectrically converts the light that has passed through the lens group 531 and the stored charge is controlled by changing the storage time in response to an input from the timing generator 424. The signal processor/memory 428 controls gain and knee characteristic and stores the sensor signal.

Figure 22:
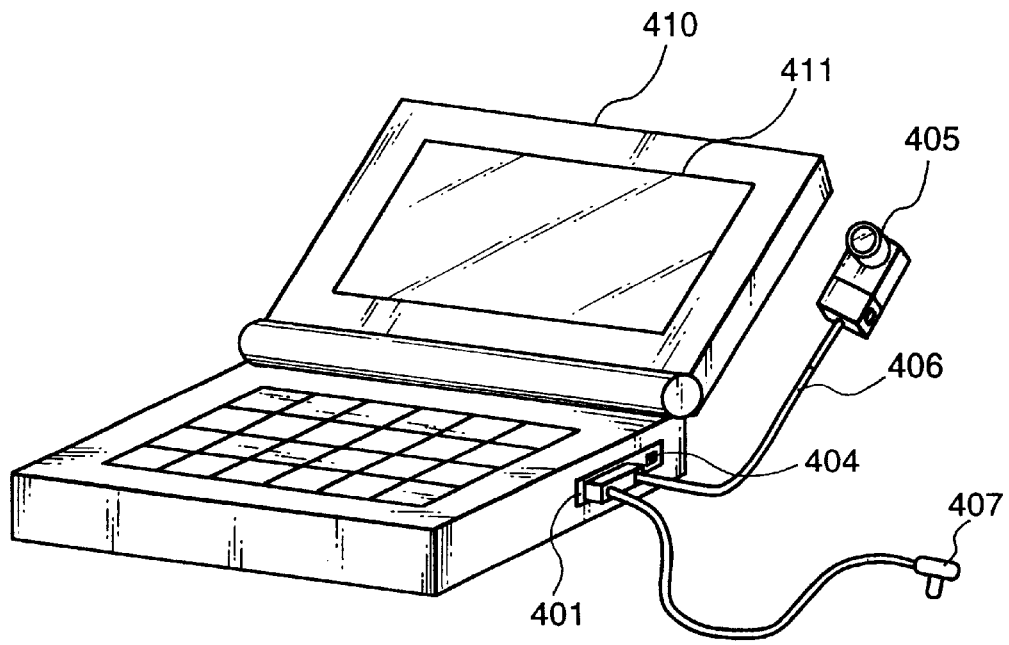
FIG. 22 is a diagram showing the PC card of the third embodiment when it has been attached to a personal computer.
Figure 23:
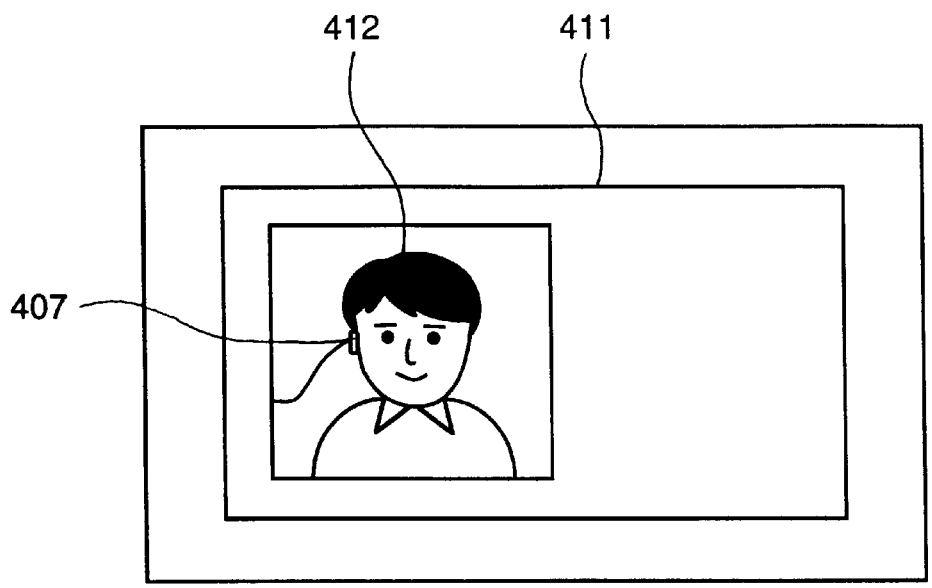
FIG. 23 is a diagram showing the state of the display on the personal computer to which the third embodiment has been attached, this display being that which prevails before a telephone conversation.

Next, a case will be described in which the camera unit 405 and earphone 407 are connected to the PC card 401 constructed as set forth above, the PC card 401 is connected to the personal computer 410, as shown in FIG. 22, and the apparatus is used to carry out a TV telephone conversation with a party possessing a similar apparatus.

In FIG. 22, a notebook-type personal computer 410 has a slot for a PC card of TYPE II in conformity with PCMCIA specifications in the side of the front half of the computer and in the side of rear half. The PC card 401 having the construction shown in FIG. 19 is inserted into the slot in the side of the front half, and another PC card (not shown), which makes possible a connection to an ISDN (not shown), is inserted in the slot of the back half. This PC card is connected to an ISDN line.

In a case where the user employs this system as a TV telephone, first the camera unit 405 is adjusted so as to point in the direction of the user by flexing the connecting cord 406 connected to the PC card 401. The earphone 407 is placed in an ear of the user.

Figure 24:
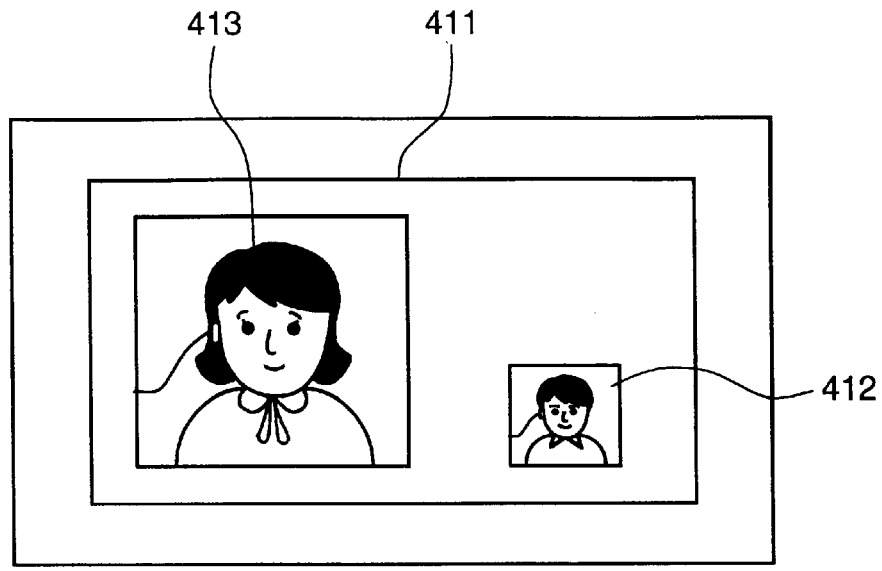
FIG. 24 is a diagram showing the state of the display on the personal computer to which the third embodiment has been attached, this display being that which prevails during a telephone conversation.

Next, TV telephone software that has already been stored on a hard disk of the notebook-type personal computer 410 is started, whereupon the face 412 of the user picked up by the camera unit 405 is displayed on the display 411 of the personal computer 410. If the position of the image seems to be displaced, the position is adjusted by flexing the connecting cord 406. Next, a call is placed to a party, already registered in the software, with which a TV telephone conversation is desired. When the called party answers and has made preparations to establish a state similar to that on the side of the user, the face 413 of the called party captured by the camera on the called party's side is displayed in enlarged form and the face 412 of the user is displayed in reduced size, as shown in FIG. 24.

The voice of the user is picked up by the microphone 404, which is provided on the end face of the PC card 401 and is externally visible, even though the PC card 401 is inserted into the notebook personal computer 410. The user's voice is thus transmitted to the called party. The voice of the called party is transmitted to the user's ear by the earphone 407. The voice is sent and received on one B channel of the ISDN line, and the image data is sent and received on the other B channel of the ISDN line. Thus, a TV telephone conversation is established with the called party.

In this case what is sent and received need not be only voice and image data but may also be text or other data.

By adopting the arrangement described above, the microphone is placed at a position visible from the outside, even though the PC card is inserted into the personal computer. This makes it possible to enter the user's voice. Further, the user need not perform a laborious operation to set up the microphone. Since the number of cables is held to the minimum, portability is excellent and the system is very easy to use. By realizing a TV telephone using a personal computer as the platform, it is possible to send and receive not only voices and images but also other types of data.

In the third embodiment, the software for implementing the TV telephone function is provided on the hard disk of the personal computer. However, an arrangement may be adopted in which the software is written in a ROM furnished within the PC card 401 and is supplied to the personal computer from the card 401. If this arrangement is adopted, it will be possible to realize a plug-and-play function in which merely inserting the PC card 401 into the personal computer automatically starts up the software for implementing the TV telephone function.

<Fourth Embodiment>

Figure 25:
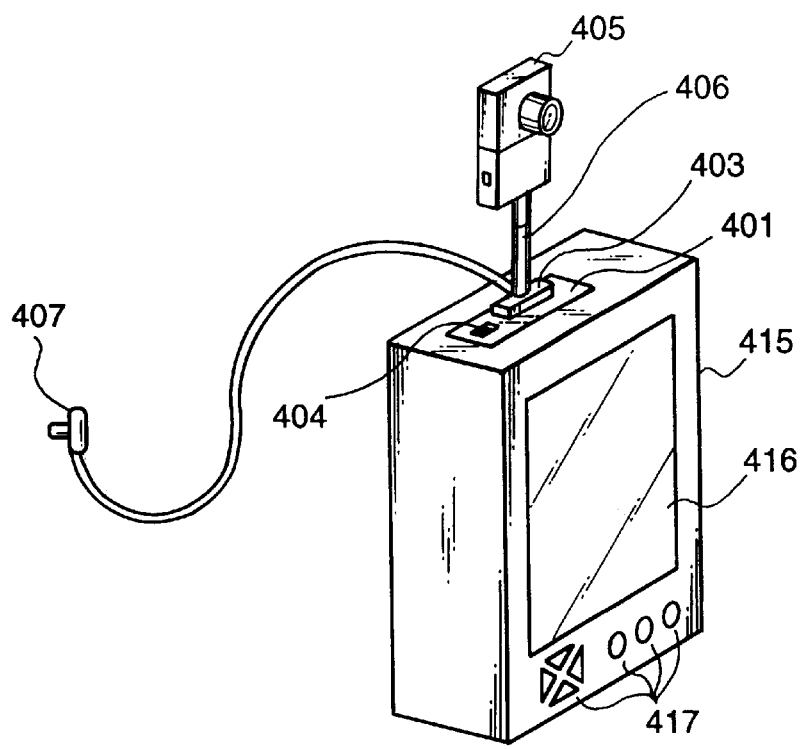
FIG. 25 is a perspective view showing a PC card of a fourth embodiment when it has been attached to a portable information terminal such as a PDA.

FIG. 25 is a diagram showing a fourth embodiment according to the present invention. Numeral 415 denotes a miniature personal information terminal (PDA, or Personal Digital Assistant), which has a function that allows the device to be connected to a telephone line in advance so as to make possible the exchange of various data. As shown in FIG. 25, the device has only one PC card slot provided in the top thereof. The PC card 401 according to this invention has the camera unit 405 and earphone 407 connected to it, and the card 401 has been inserted into the aforementioned slot of the PDA 415. The PDA 415 has a display 416 and the minimum required number of buttons 417. The PDA 415 does not have an internal speaker in order to enhance the portability of the device.

The method in which the system is used is substantially the same as in the case of the third embodiment. Since a PDA is almost always used by being held in one hand, the orientation of the camera unit 405 is decided by moving the PDA.

By adopting the above-described arrangement, a TV telephone function can be realized with ease so long as a device such as the PDA is connectable to a telephone line, even if the PDA does not have an internal speaker.

<Features of Third and Fourth Embodiments>

In accordance with the card camera of the third and fourth embodiments, the card camera has a camera connection unit to which a camera unit is connectable and which is capable of being inserted into a host device connectable to a communication line such as a telephone line, and a microphone. As a result, a compact, portable personal computer such as a notebook-type personal computer or a personal information device such as a PDA can be additionally provided with a TV telephone function.

Further, the card camera has a camera connection unit, a speaker connection unit to which a speaker such as an earphone is capable of being connected, and a microphone. As a result, a compact, portable personal computer such as a notebook-type personal computer or a personal information device such as a PDA not having a speaker can be additionally provided with a TV telephone function.

Further, the card camera has a camera connection unit and a microphone, which is provided on the end face of the card opposite the side thereof that is connected to the computer or PDA. As a result, a compact, portable personal computer such as a notebook-type personal computer or a personal information device such as a PDA can be additionally provided with a TV telephone function in which the number of connectors and the number of cables are minimized. Since the microphone is exposed even when the PC card is inserted into the computer or PDA, audio can be picked up without problems and a TV telephone function can be provided while minimizing the numbers of connectors and cables.

Further, the card camera has a camera connection unit, a speaker connection unit to which a speaker such as an earphone is capable of being connected., and a microphone, which is provided on the end face of the card opposite the side thereof that is connected to the host device. As a result, a compact, portable personal computer such as a notebook-type personal computer or a personal information device such as a PDA not having a speaker can be additionally provided with a TV telephone function in which the number of connectors and the number of cables are minimized. Since the microphone is exposed even when the PC card is inserted into the computer or PDA, audio can be picked up without problems and a TV telephone function can be provided while minimizing the numbers of connectors and cables.

Further, by providing the camera connection unit and the speaker connection unit on the same portion of the card, connection at a single location is sufficient. This makes it easy to make the connection.

<Fifth Embodiment>

Conventionally, when a camera is used in, say, a TV conference system, the camera usually is used upon being fixed to a corner of monitor or upon being placed on an independent panning head.

The camera and the main body of the device which processes the image data are entirely separate bodies and are connected by a connecting cable. Consequently, since the camera unit can be mounted at a location that is selectable, the vertical direction of the camera and the vertical direction of the image can be made to coincide at all times.

However, in a case where the camera is connected to a compact computer such as a notebook-type personal computer, palm-top computer of PDA and image processing is executed, a PC card is inserted into a slot provided in the side of the compact computer in order to obtain an additional function such as an image input function, as described in the previous embodiments. However, the direction of the slot is not uniquely determined and differs depending upon the type of machine.

When a camera having a structure in which the lens is directly attached to the PC card is used and the image is set so as to be upright in the case of a compact computer in which the PC card slot is located on the right-hand side, the image will be upside-down if image pick-up is attempted in the same direction using a compact computer of a different type in which the slot is located on the left-hand side. This problem arises not only with a PC card but also with a miniature camera.

With the PC camera card of the fifth embodiment, the image pick-up camera unit performs image capture by being pointed in the direction of photography. Even if the orientation of the upper portion of the apparatus is unnatural, image data having the correct vertical direction can be outputted to the connected PC card by pointing the camera unit in the direction of photography.

Figure 26A:
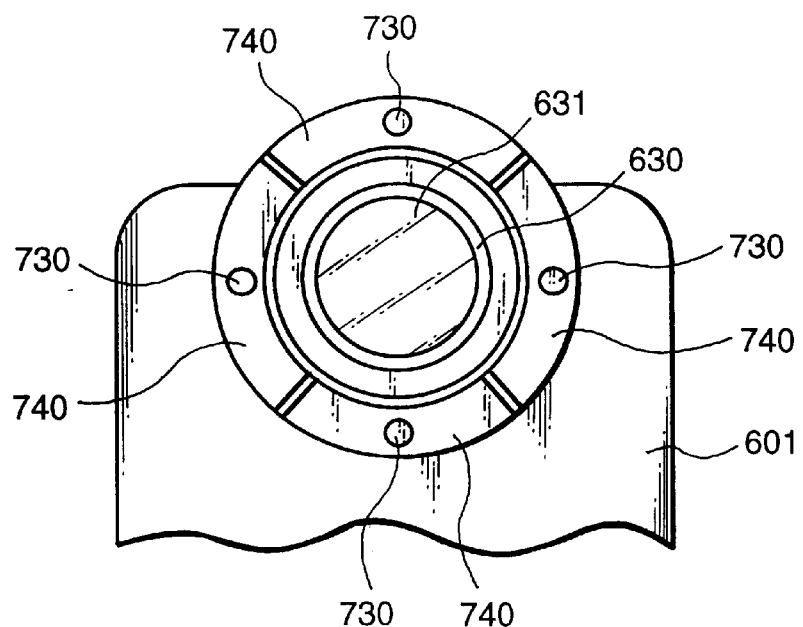
FIGS. 26A, 26B are explanatory views showing the construction of a fifth embodiment of the present invention.
Figure 26B:
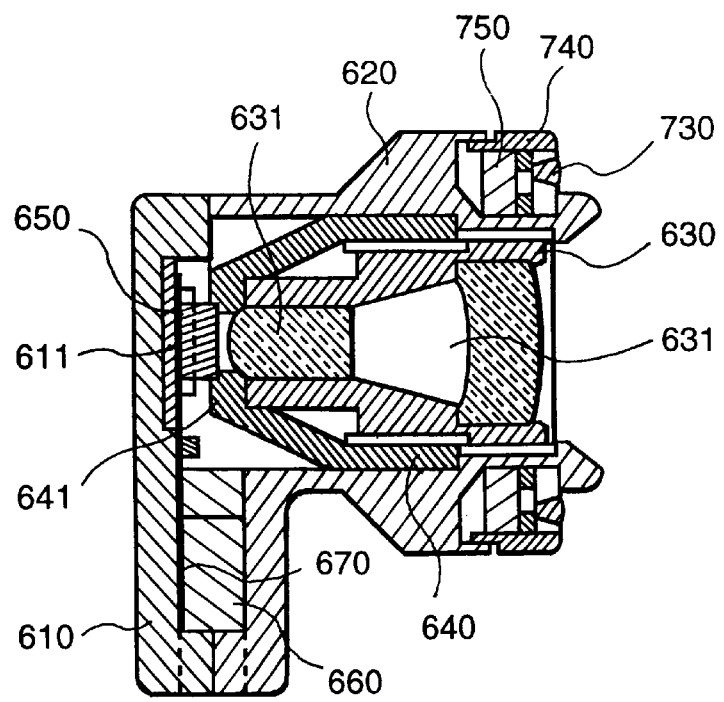

FIGS. 26A and 26B are illustrative views showing the construction of the camera unit according to the fifth embodiment of the invention. FIG. 26A is an external front view and FIG. 26B a sectional view of the principal components.

Shown in FIGS. 26A and 26B are camera unit 601, a back cover 610, a resilient member 611, a front cover 620, a lens barrel unit 630, a photographic lens group 631, a focus spacer 640, an image sensor 650, a connector receptacle 660, a flexible printed circuit board 670, and LED indicators 730 placed at four locations in this embodiment. The LED indicator that comes to be located above the image is lit. Numeral 740 denotes a switch plate for urging a switch actuator 750.

The lens barrel unit 630 holding the lens group 631 is threadedly engaged with the focus spacer 640 and turns relative to the spacer so that a focusing adjustment can be performed. The focus spacer 640 has a spot facing 641 which mates with the exterior of the package of image sensor 650, which consists of a transparent plastic package. By being brought into abutting contact with the front face of the package, the spacer effects positioning along three axes.

The flexible printed circuit board 670 on which the sensor 650, the connector receptacle 660 and peripheral elements (not shown) are mounted is clamped between the front cover 620 and back cover 610 via the resilient member 611, such as a sponge or rubber sheet, disposed at the back of the sensor in the plane of the board. Thus the board is clamped in the abutting state. By providing the cover members or the flexible printed circuit board itself with an elastically deformed urging member, the resilient member 611 may be eliminated.

Figure 27:
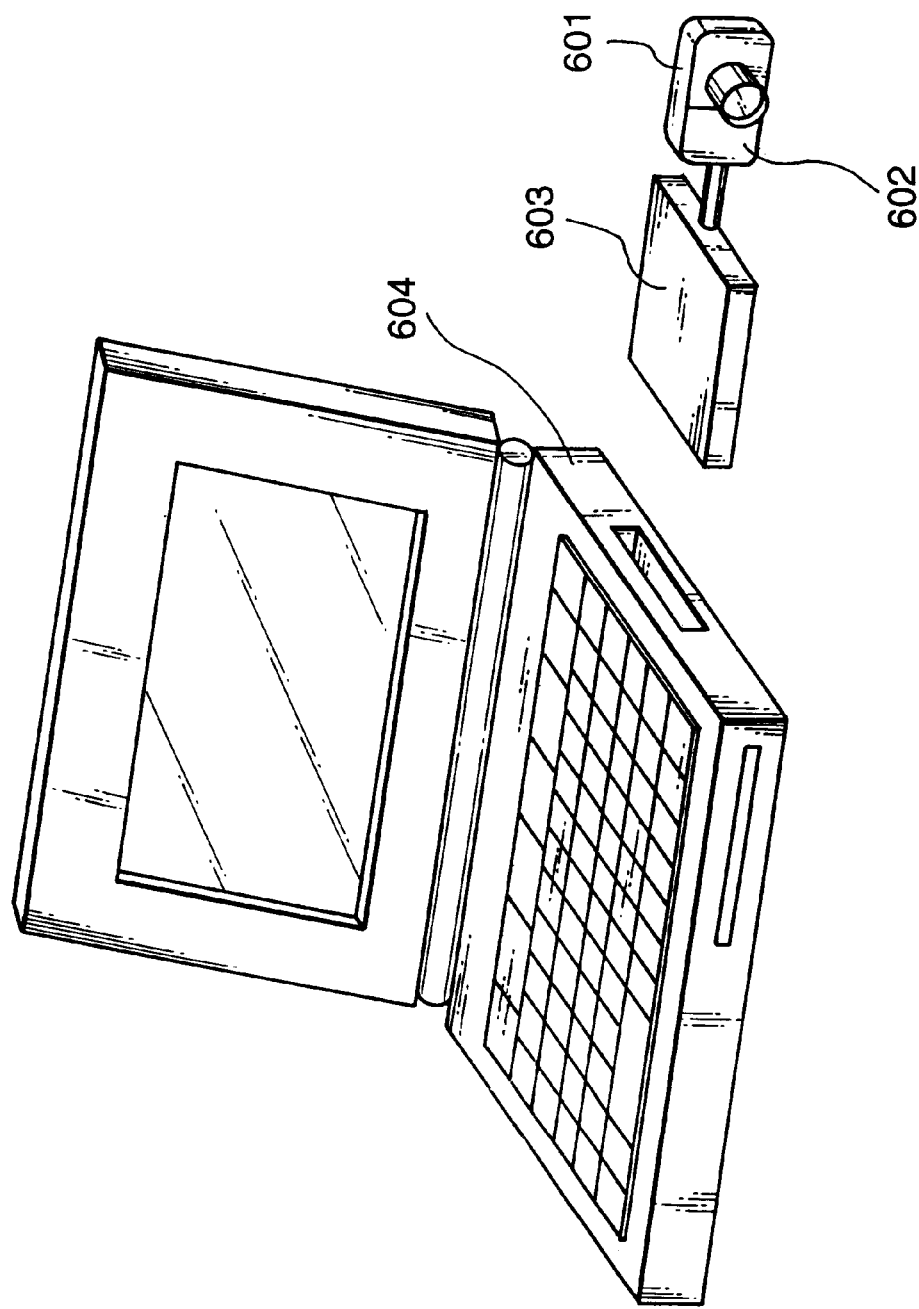
FIG. 27 is a perspective view showing the fifth embodiment in a state connected to a personal computer.

FIG. 27 is a perspective view showing that a solid-state image sensing device according to this embodiment is to be loaded in a notebook-type personal computer. Shown in FIG. 27 are the camera unit 601, a connection unit 602, a PC card 603 such as one in conformity with PCMCIA or JEIDA specifications, and a notebook-type personal computer 604.

Figure 28A:
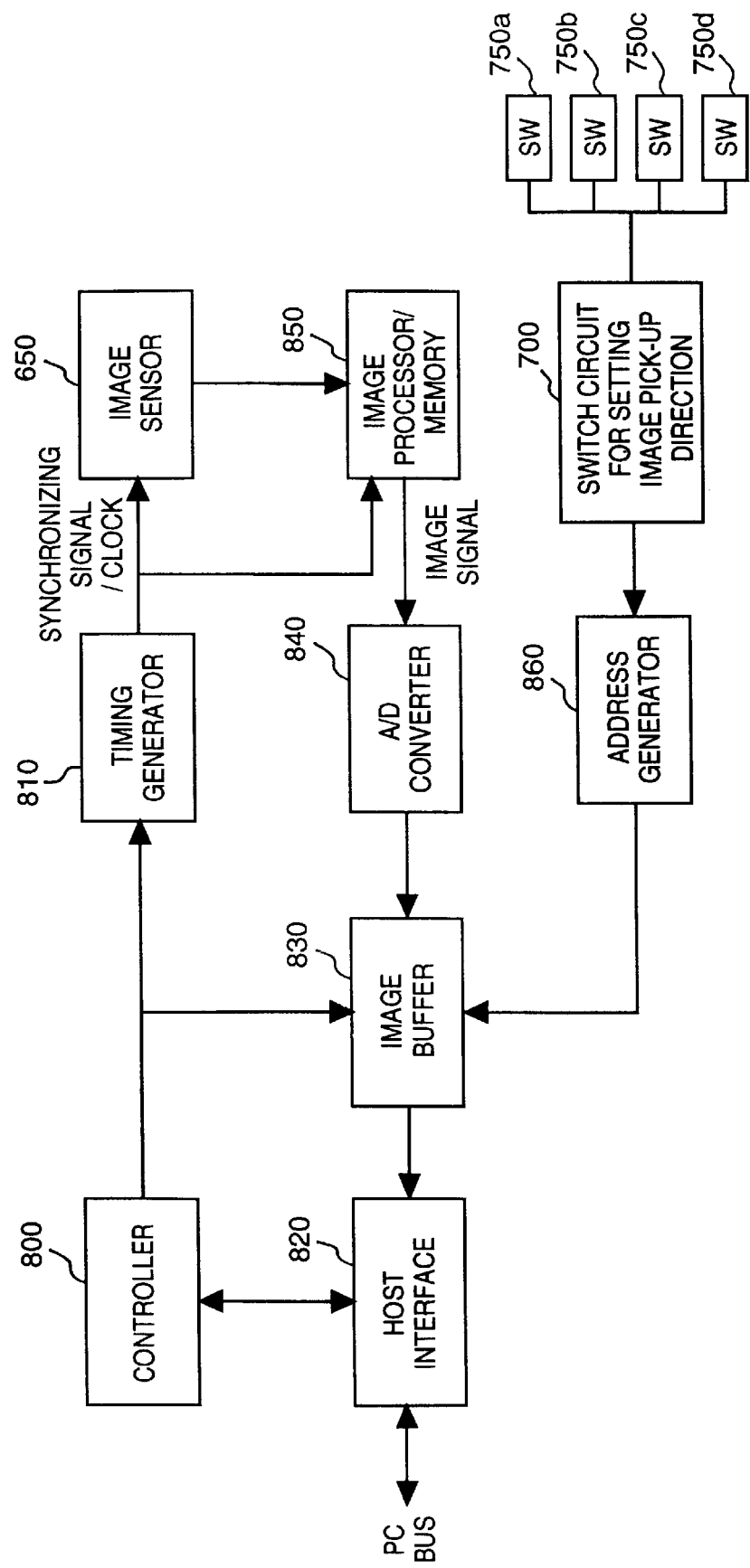
FIG. 28A is a block diagram of the fifth embodiment.

FIG. 28A is a block diagram showing an embodiment of the solid-state image sensing device. This diagram will be referred to in order to describe the operation of the device.

An image sensor 650 accepts an image and performs a photoelectric conversion of the image. The image signal entered by the image sensor 650 is sent to an image processor/memory 850. The signal processor/memory 850 controls the gain and knee characteristic and stores the image signal. A timing generator 810 performs reset control and storage-time control of the image sensor and memory, transfers electric charge from the image sensor to the memory and designates control of signal processing.

An A/D converter 840 converts an analog image signal from the signal processor/memory 850 into digital data. The image data digitally converted by the A/D converter 840 is written in an image buffer 830.

The photographer presses any one of the four switch plates 740 surrounding the lens. Each switch plate 740 is provided with the aforementioned switch actuator 750. When a specific one of the switch plates 740 is pressed, the actuator 750 operatively associated with it is actuated. A signal from this actuator plate is sent to an address generator 860 via a switch circuit 700 (FIG. 28A) which decides the direction of photography. The address generator 860 decides the order in which image data that has been written in the image buffer 830 is read out. The image data can be read out in an upright attitude or in any other orientation depending upon the decision made.

More specifically, FIG. 28B illustrates a case in which the camera is turned upside-down so that the face of the observer is imaged upside-down. In this case, the image of the face of the observer is stored in the image buffer 830 in the manner shown in FIG. 28B. The photographer presses switch 740c. When this is done, the address generator 860 generates a readout sequence shown at 880. As a result, the inverted image of the face is sent to the personal computer as an upright image.

The image data read out is sent to a host interface 820. The notebook-type personal computer (the host) connected to the PC bus by the interface 820 performs an exchange of command/status with the camera unit and reads out data via the interface 820.

A controller 800 receives commands from the host, controls the operation of the timing generator 810 and controls read/write of the image buffer 830.

The switch circuit 700 for deciding the direction of image pick-up in this embodiment includes four switch plates 740 for deciding direction and four switch actuators 740. However, the number of these components is not limited to four.

<Effects of the Fifth Embodiment>

One effect of the fifth embodiment constructed as set forth above is as follows: The order in which the captured image is read out is changed by manipulating a plurality of switches formed as an integral part of the capture camera and arranged about the periphery of the camera. This makes it possible to supply an image having any orientation irrespective of the orientation of the camera.

A second effect is that by adopting a structure in which the camera unit and orientation sensing means are connected to a PC card, it is possible to supply an image which is upright or in any other orientation irrespective of the orientation of the slot in which the PC card is inserted.

A third effect is that the photographer is capable of being notified, by indicating means such as lamps during imaging, which direction coincides with the top side of an image.

<Sixth Embodiment>

The object of the camera of the sixth embodiment is the same as that of the camera of the fifth embodiment.

Figure 29A:
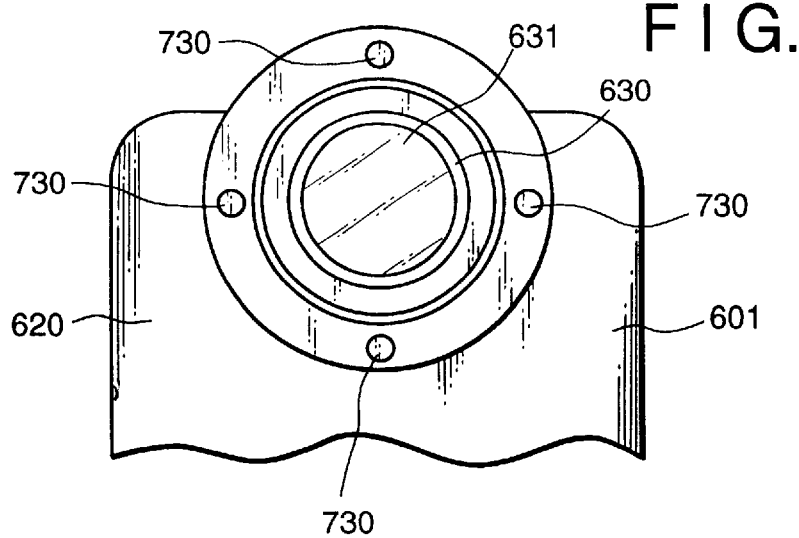
FIGS. 29A, 29B are explanatory views showing the construction of a sixth embodiment of the invention.
Figure 29B:
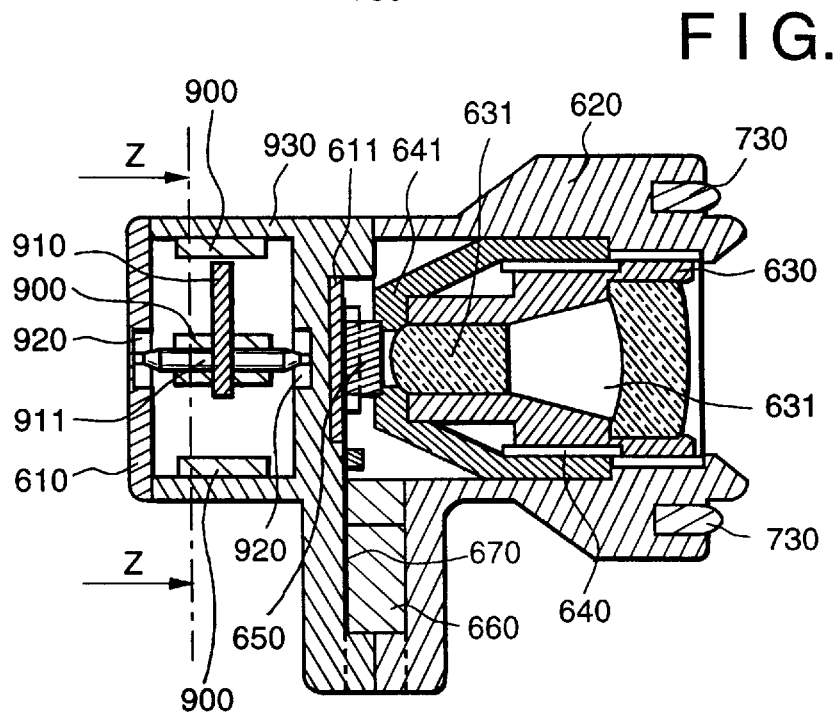
Figure 30:
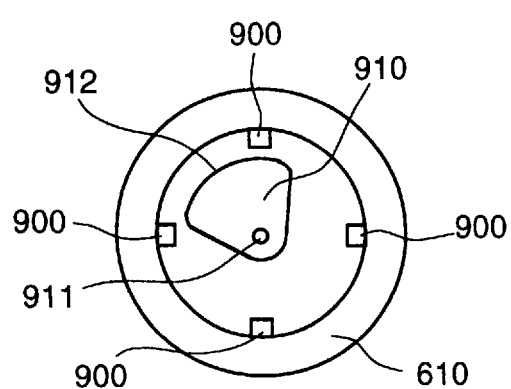
FIG. 30 is a sectional view taken along line Z—Z of FIG. 29B.

FIGS. 29A, 29B are explanatory views showing the construction of a camera unit according to a sixth embodiment of the invention FIG. 29A is an external front view and FIG. 20B a sectional view of the principal components. FIG. 30 is a sectional view taken along line Z—Z of FIG. 29B. Components identical with or corresponding to those of the fifth embodiment are designated by like reference characters.

Shown in FIGS. 29A, 29B and FIG. 30 are a camera unit 601, a back cover 610, a central cover 930, a resilient member 611, a front cover 620, a lens barrel unit 630, a photographic lens group 631, a focus spacer 640, an image sensor 650, a connector receptacle 660 and a flexible printed circuit board 670.

Numeral 900 denotes a proximity sensor, 910 a sector-shaped rotating pendulum a portion of the circumference of which has been cut away, and 911 a rotary shaft. A sector-shaped portion 912 of the pendulum is formed as an integral part of the shaft 911 and consists of a material sensed by the proximity sensor 900. A bearing 920 allows the shaft 911 to turn smoothly. LED indicators 730 placed at four locations in this embodiment. The LED indicator that comes to be located above the image is lit.

The lens barrel unit 630 holding the lens group 631 is threadedly engaged with the focus spacer 640 and turns relative to the spacer so that a focusing adjustment can be performed. The focus spacer 640 has the spot facing 641 which mates with the exterior of the package of sensor 650, which consists of a transparent plastic package. By being brought into abutting contact with the front face of the package, the spacer effects positioning along three axes.

The flexible printed circuit board 670 on which the sensor 650, the connector receptacle 660 and peripheral elements (not shown) are mounted is clamped between the front cover 620 and central cover 930 by the resilient member 611, such as a sponge or rubber sheet, disposed at the back of the image sensor 650 in the plane of the board. Thus the board is clamped in the abutting state. By providing the cover members or the flexible printed circuit board itself with an elastically deformed urging member, the resilient member 611 may be eliminated.

The state in which the camera of the sixth embodiment is inserted into the notebook-type personal computer is the same as that of the fifth embodiment. Shown in FIG. 27 are the camera unit 601, the connection unit 602, the PC card 603 such as one in conformity with PCMCIA or JEIDA specifications, and the notebook-type personal computer 604.

Figure 31:
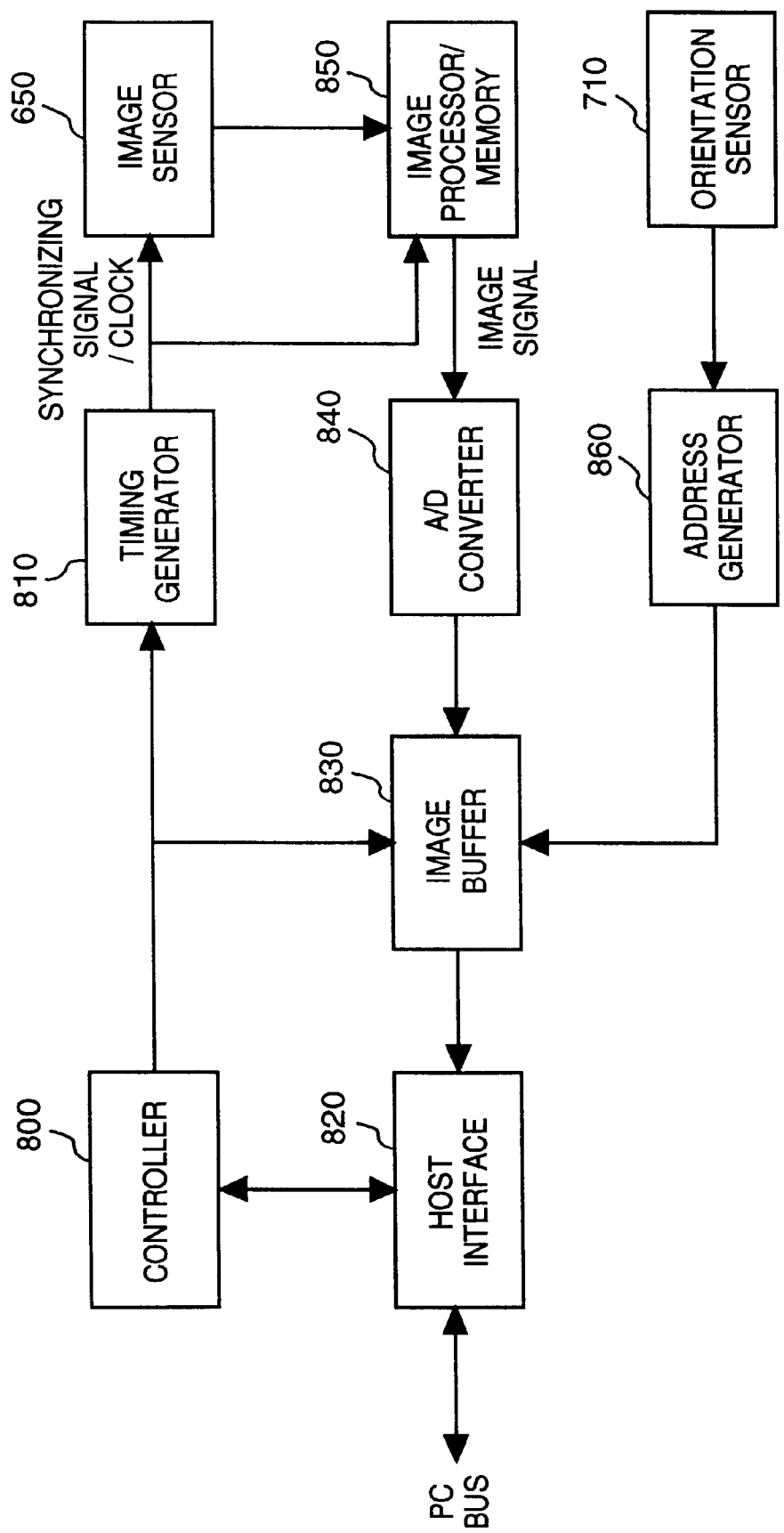
FIG. 31 is a block diagram of the sixth embodiment.

FIG. 31 is a block diagram showing an embodiment of the solid-state image sensing device. Components identical with or corresponding to those of the fifth embodiment are designated by like reference characters. This diagram will be referred to in order to describe the operation of the device.

The image sensor 650 accepts an image and performs a photoelectric conversion of the image. The image signal entered by the image sensor 650 is sent to the image processor/memory 850. The signal processor/memory 850 controls the gain and knee characteristic and stores the image signal. The timing generator 810 performs reset control and storage-time control of the image sensor and memory, transfers electric charge from the image sensor to the memory and designates control of signal processing.

The A/D converter 840 converts the analog image signal from the signal processor/memory 850 into digital data. The image data digitally converted by the A/D converter 840 is written in the image buffer 830.

At times other than when image pick-up is performed with the camera in a vertical attitude, the rotating pendulum 910 always assumes a certain orientation in response to the lens being pointed at the subject for the purpose of image capture, and any one of the four proximity sensors 900 is capable of sensing a position on the outer circumference of the sector-shaped portion 912. The signal indicative of the direction sensed decides the order in which the image data, which has been written in the image buffer 830 by the address generator 860, is read out of the buffer. The image data can be read out in an upright attitude or in any other orientation depending upon the decision made. The read image data is sent to the host interface 820. The notebook-type personal computer (the host) connected to the PC bus by the interface 820 performs an exchange of command/status with the camera unit and reads out data via the interface 820.

A controller 800 receives commands from the host, controls the operation of the timing generator 810 and controls read/write of the image buffer 830.

In this embodiment, it has been described that the image is sent in the upright attitude. If necessary, however, transmission of the image on its side or in an upside-down attitude can be carried out by changing the address generated by the address generator 860. The number of proximity sensors 900 that construct an orientation sensor 710 is four in this embodiment. However, the number of these proximity sensors is not limited to four.

<Effects of the Sixth Embodiment>

One effect of the sixth embodiment constructed as set forth above is as follows: Sensor means for sensing the vertical direction by utilizing the force of gravity is formed as an integral part of the camera for image capture, and the order in which the captured image is read out is changed based upon the sensed information. This makes it possible to supply an image having any orientation irrespective of the orientation of the camera.

A second effect is that by adopting a structure in which the camera unit and orientation sensing means are connected to a PC card, it is possible to supply an image in any orientation irrespective of the orientation of the slot in which the PC card is inserted.

A third effect is that the photographer is capable of being notified, by indicating means such as lamps during imaging, which direction coincides with the top side of an image.

A fourth effect is that the sector-shaped pendulum, which notifies the photographer by indicating means such as lamps during imaging which direction coincides with the top side of an image, tilts owing to the force of gravity and the direction of this inclination is sensed by a plurality of sensing means disposed about the circumferential portion. This makes it possible to change the order in which an image captured by the camera unit is read out, i.e., to change the orientation of the image.

Thus, in accordance with the fifth and sixth embodiments, even if the orientation of the upper portion of the apparatus is unnatural, image data having the correct vertical direction can be outputted to the connected PC card by pointing the camera unit in the direction of photography. In addition, reliability can be enhanced and cost reduced because of the small number of parts.

<Seventh Embodiment>

A seventh embodiment of the invention will now be described. The seventh embodiment makes it possible to achieve coincidence of line of sight between two parties in a conversation in a case where one party converses with the computer of another party in on a real-time basis.

Figure 1:
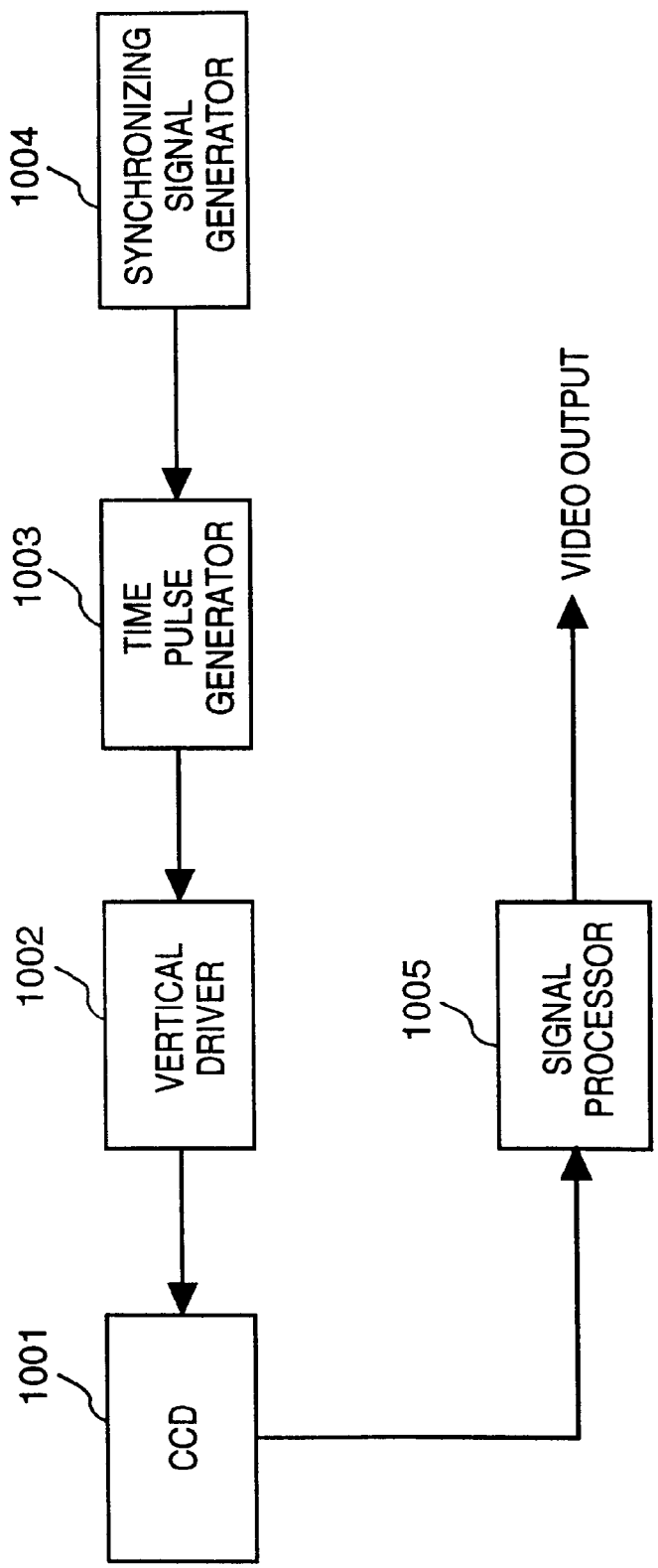
FIG. 1 is diagram showing the construction of a monochrome video camera according to the prior art.
Figure 2:
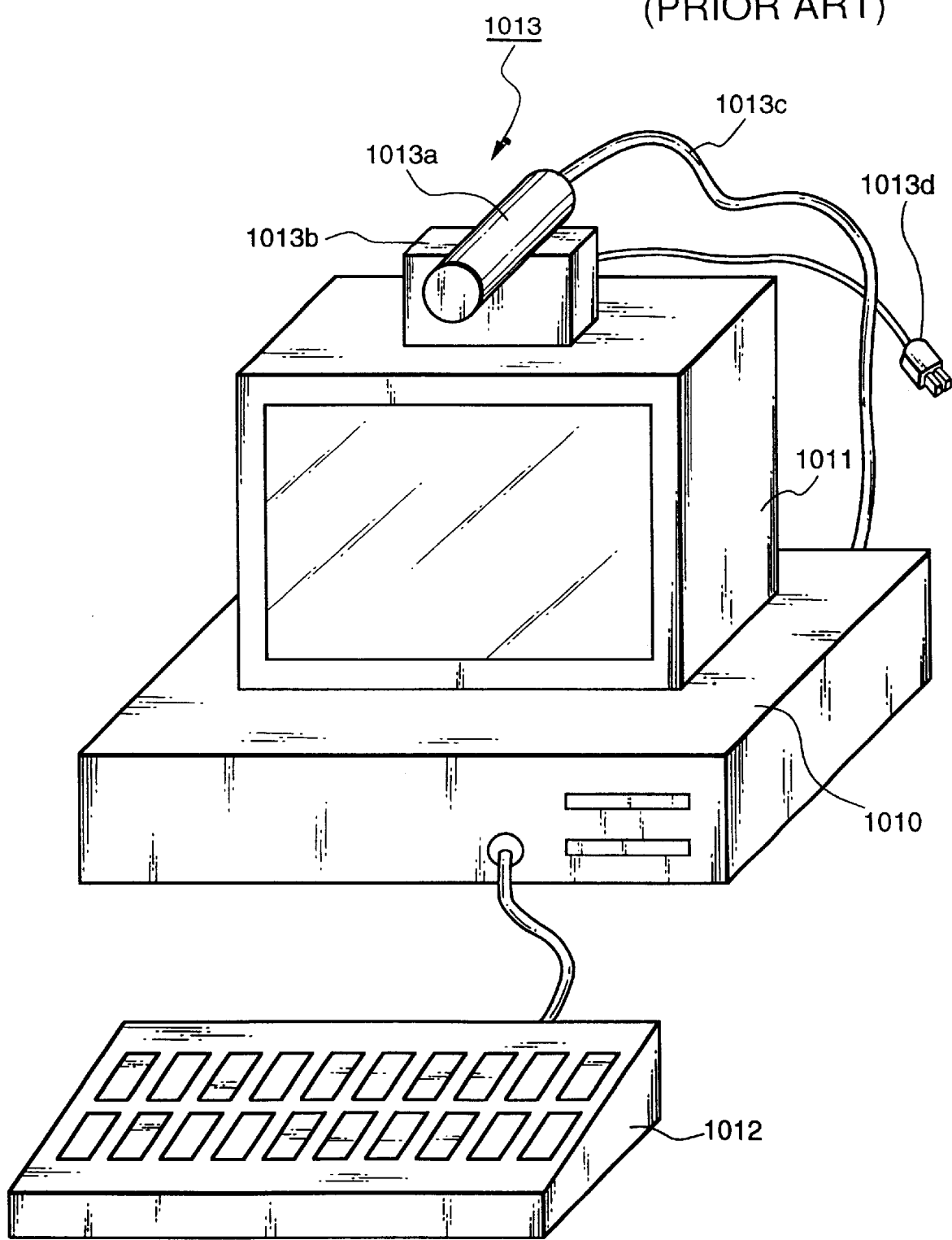
FIG. 2 is an explanatory view illustrating an example of use of a video camera used upon being connected to a personal computer.
Figure 3:
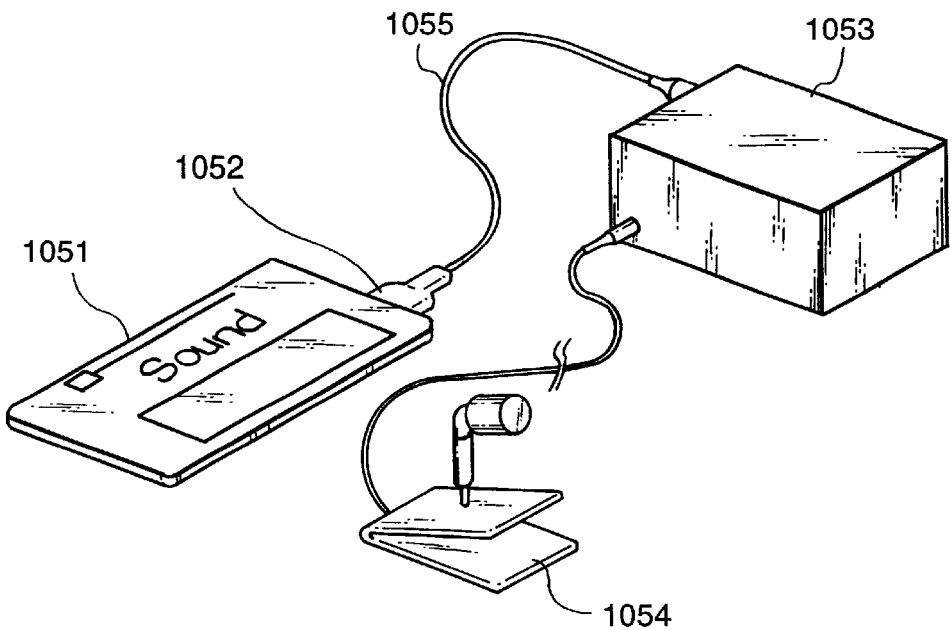
FIG. 3 is an explanatory view showing the state of utilization of a PC card according to the prior art.
Figure 4:
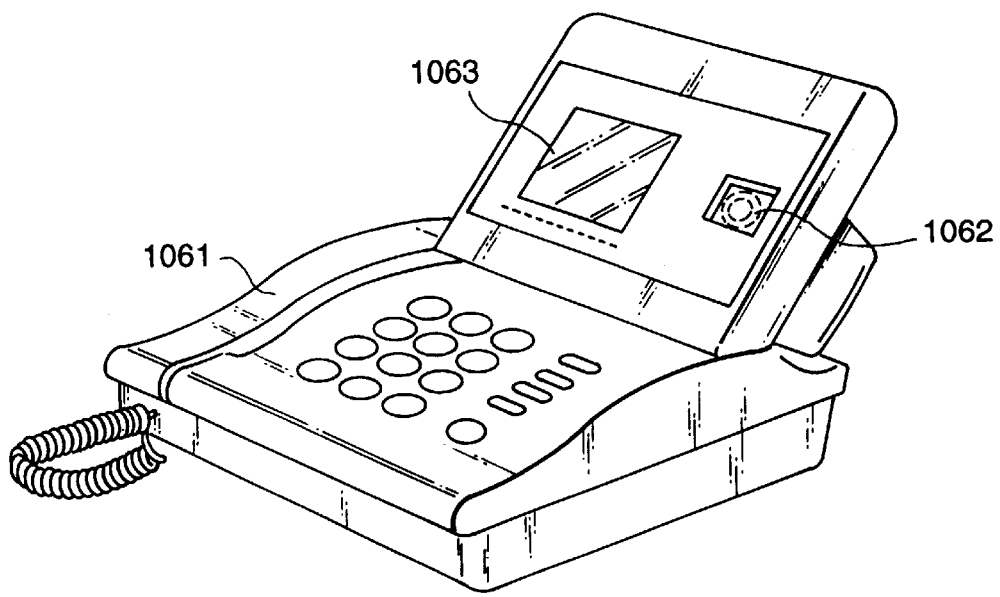
FIG. 4 is an explanatory view of a TV telephone according to the prior art.
Figure 5:
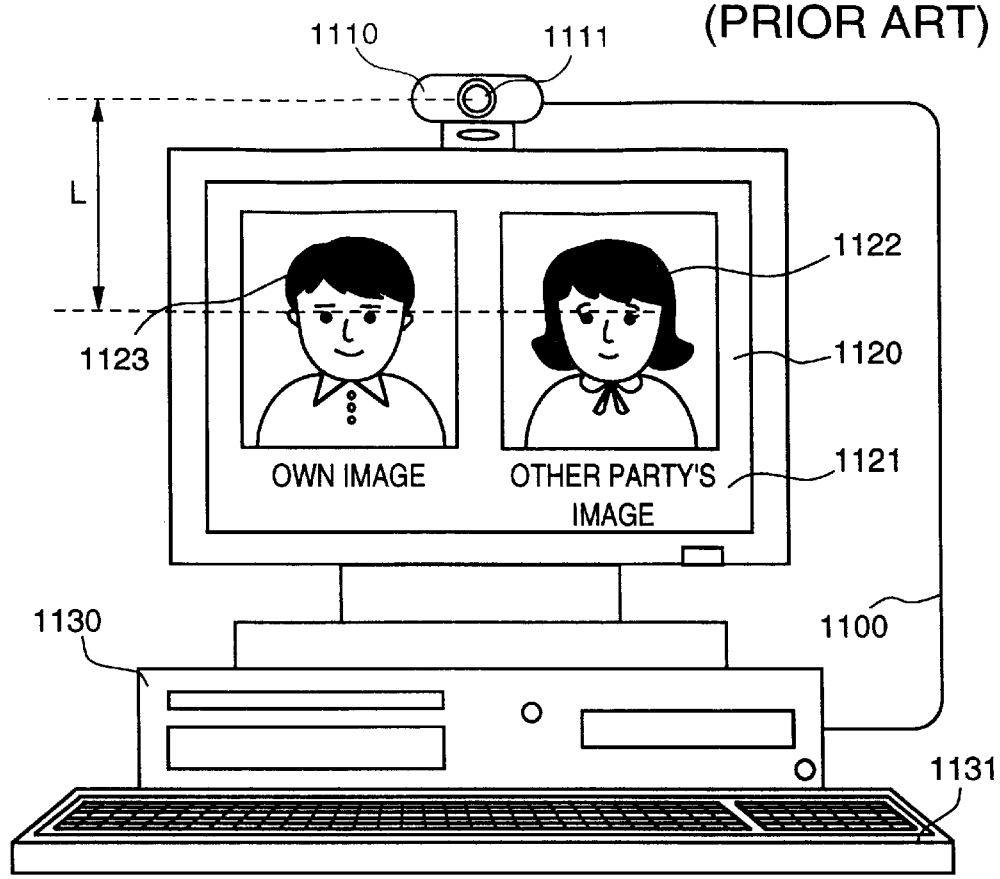
FIG. 5 is a diagram showing an example of the construction of an image communication apparatus according to the prior art.
Figure 6:
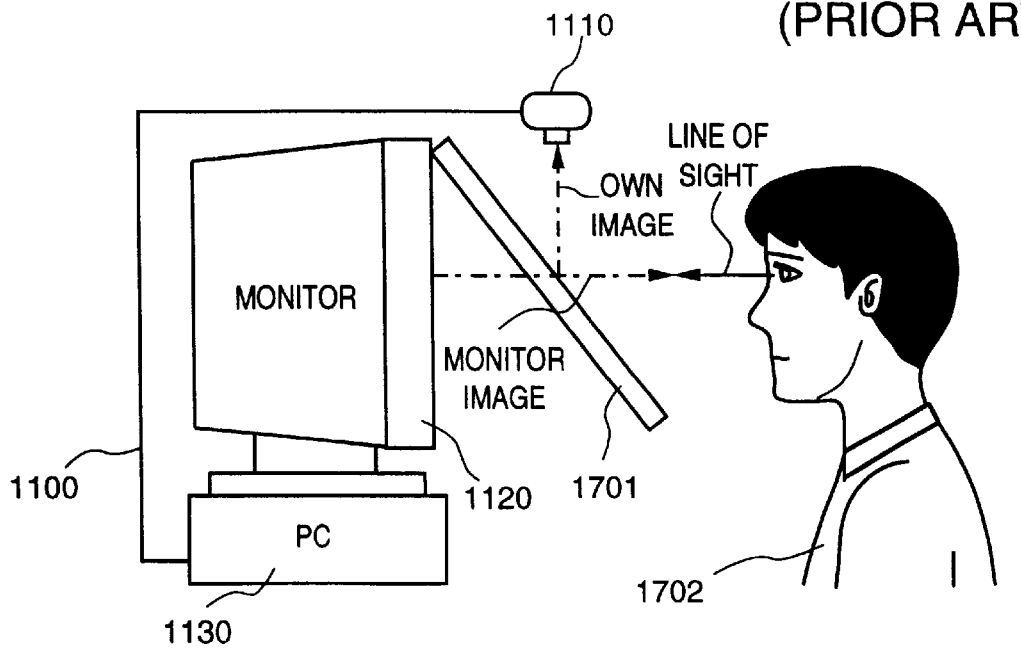
FIG. 6 is a schematic view showing the arrangement of means for achieving coincidence of line of sight according to an example of the prior art.
Figure 32:
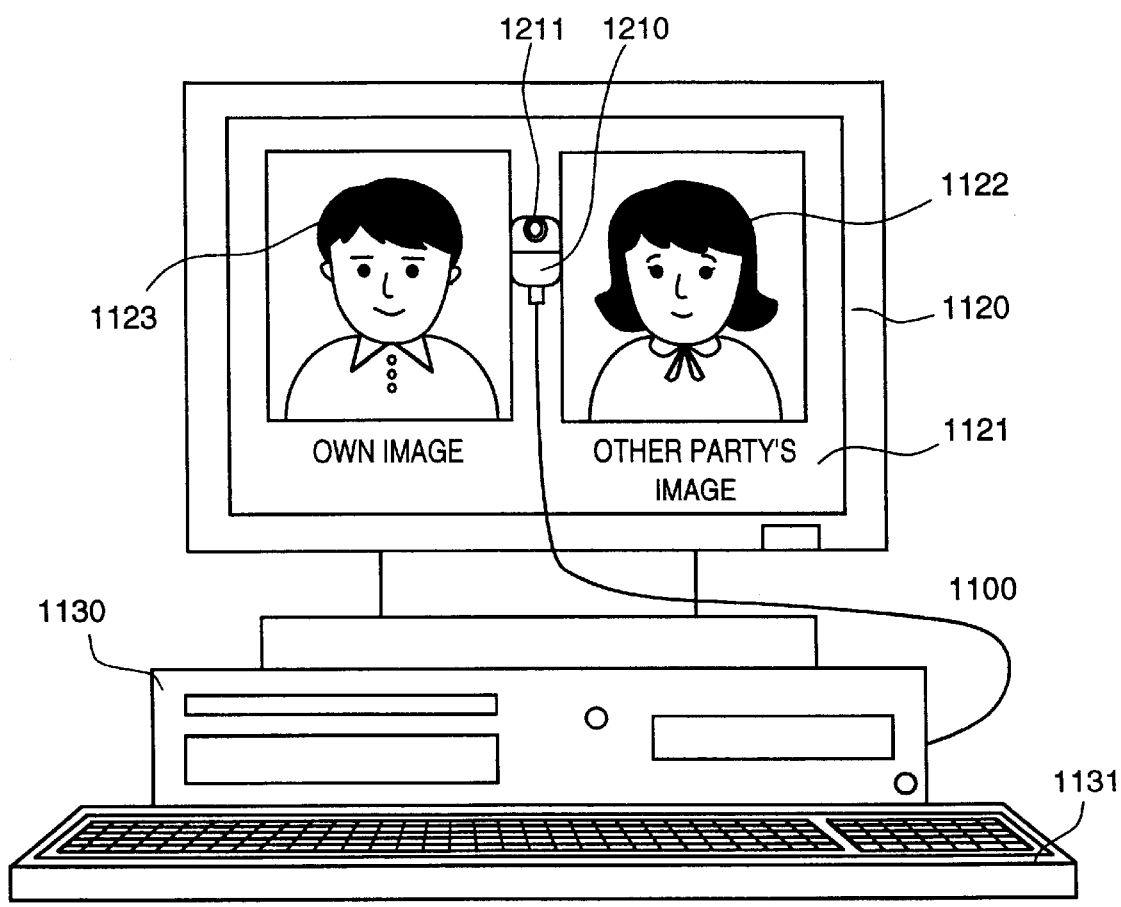
FIG. 32 is a schematic view showing an image communication apparatus according to a seventh embodiment of the invention.

FIG. 32 is a schematic view showing an image communication apparatus according to a seventh embodiment of the invention. Components identical with or corresponding to those of the prior art in FIG. 5 are designated by like reference characters.

In FIG. 32, numeral 1210 denotes a mechanical portion (the so-called camera unit) through which light cannot pass, and number 1211 denotes a camera lens unit. Also shown are the monitor 1120, the monitor display screen 1121, the image 1122 of the other party to communication, the operator's own image 1123, the computer 1130 constructing the communication apparatus, the keyboard 1131 and the connecting cord 1100.

A communication extension card (not shown) has been inserted into the computer 1130, which has been connected to a communication line such as a PSTN, an ISDN or a LAN, etc. Image communication software has been loaded in the computer 1130, and the arrangement, which has been assembled so as to be suitable for image communication, is well known.

The camera unit 1210 is fixedly attached to the monitor screen in such a manner that part of the screen is hidden from view. By thus placing the camera unit 1210 within the confines of the monitor display screen, the distance between the other party's image 1122 and the camera lens unit 1211 is made shorter than in a case where the camera unit is placed on the top of the housing of the monitor 1120 outside the screen in the manner shown in FIG. 5 according to the prior art. As a result, parallax is reduced over that of the prior art and approximate coincidence of lines of sight is achieved. In this case, there is less of a disagreeable sensation when the parties are face to face if the position at which the camera 1210 is fixed is set so as to give priority to a reduction in horizontal parallax over a reduction in vertical parallax.

In other words, if the lens unit 1211 is placed on the vertical center line of the other party's image (directly above or below the image on the screen), horizontal parallax is eliminated and substantial coincidence of lines of sight is achieved, though this depends to some extent upon the camera field angle or image display magnification. Satisfactory results are obtained in practice with an inexpensive arrangement that does not use a half-mirror.

Figure 33A:
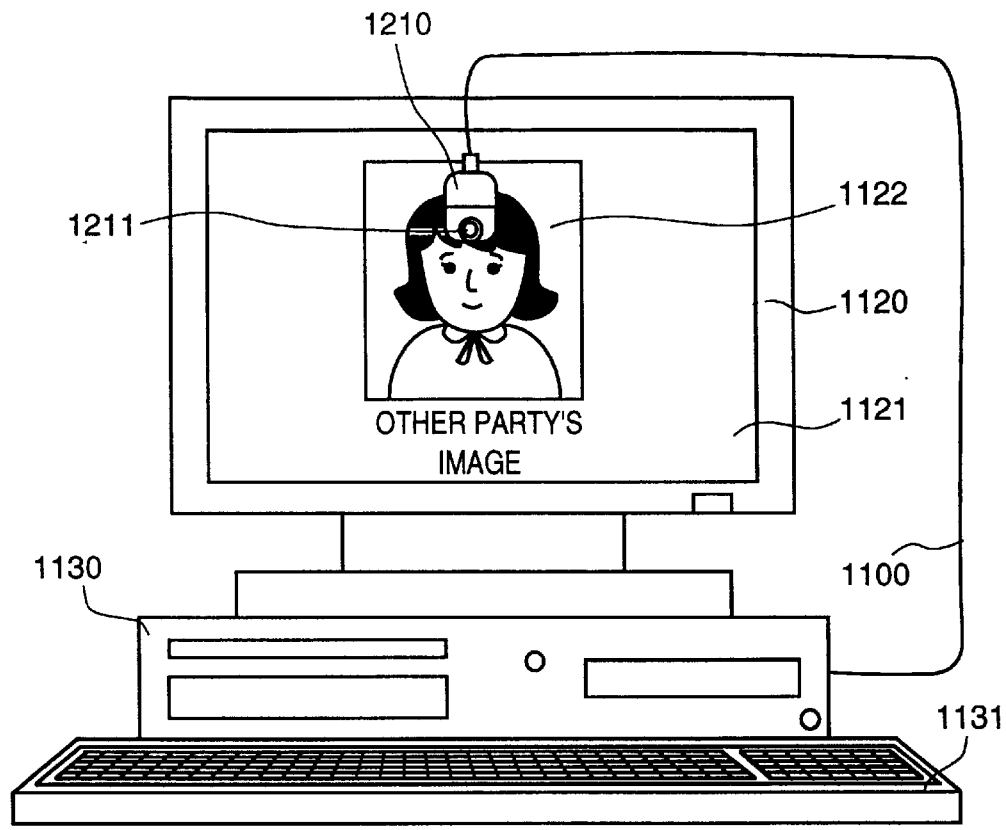
FIG. 33A is a diagram showing an example in which camera position is changed in FIG. 32.
Figure 33B:
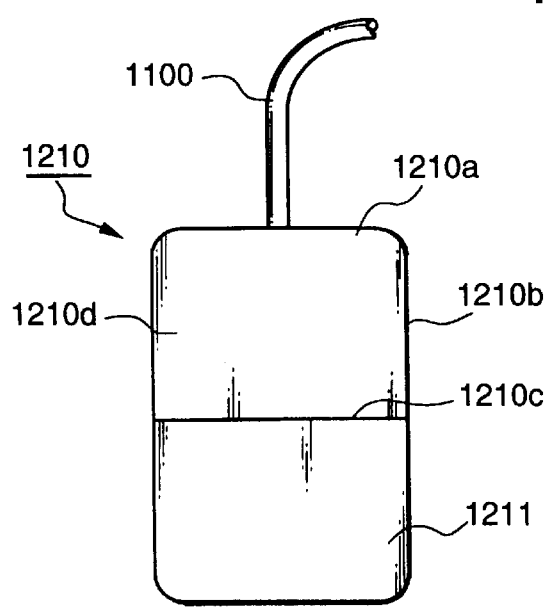
FIG. 33B is a diagram for describing the relationship between a camera unit and a lens unit in FIG. 32.

In FIG. 33B, the camera unit 1210 is so arranged that the lens unit 1211 is contiguous to the outermost edge 1210c of the camera unit. Furthermore, the lens unit 1211 is made adjacent to a side 1210c that is opposite the cord 1100. Four sides (1210a, 1210b, 1210c, 1210d) define the outermost shape of the camera unit. By virtue of this arrangement, the cord 1100 can be led away from the monitor image with ease. Furthermore, the lens unit 1211 is placed as close as possible to the other party's image 1122 with the lens being moved in from the head side of the image 1122 to minimize the portion of the image that will be hidden from view. As a result, regardless of the fact that camera unit 1210, namely the non-transparent mechanical portion, is placed in close proximity to the image 1122 on the monitor 1120, any unpleasant sensation caused by this is mitigated and it is possible to effectively eliminate such a sensation by approximate coincidence of lines of sight at the time of face to face conversation with respect to the screen.

In a case where different image communication software is used or the monitor size or display resolution are different, the display positions and forms of the sent and received images will differ with a communication apparatus using a general-purpose computer as in the seventh embodiment. Furthermore, even if the software is the same but there are a plurality of display modes and the prevailing mode is changed over (as when there is a changeover between a mode for simultaneous display of sent and received images and a mode for displaying only the received image), or if there is a changeover between an enlarged image or a reduced image, or if a window is moved by an operation within a window in a multiple-window environment, the display position or form will be different. In such case it will be necessary to move the camera suitably in conformity with the other party's image that is shifted.

The camera apparatus of the seventh embodiment is provided with fixing means capable of releasing the camera from the display screen and of re-fixing the camera after the camera has been moved. The selection of the fixing means is made depending upon the type of monitor, its construction and the state of surface treatment. As will be described later, however, almost all presently available monitors can be dealt with by adopting an arrangement in which the camera unit 1210 employs a suction-cup member (1301 in FIG. 34) or adhesive member (1402 in FIG. 35).

In a case where the fixing method uses the adhesive member 1402, it is possible to fix the camera even on the lenticular lens surface of a projection television of the back-projection type. Portability is enhanced as well.

In an image communication apparatus using a general-purpose computer of the kind used in the seventh embodiment, there are many cases where the camera is unnecessary when the computer is used in the ordinary manner for purposes other than image communication. In such cases the camera unit 1210 need only be removed from the screen. If the fixing means is of the readily releasable type described above, the camera need only be released from the fixed state and removed from the monitor 1120. Anyone can perform this operation without special instructions. Such fixing means is extremely effective in a case where a system using an inexpensive personal computer is constructed to provide an image communication apparatus targeted broadly on general users.

Figure 34:
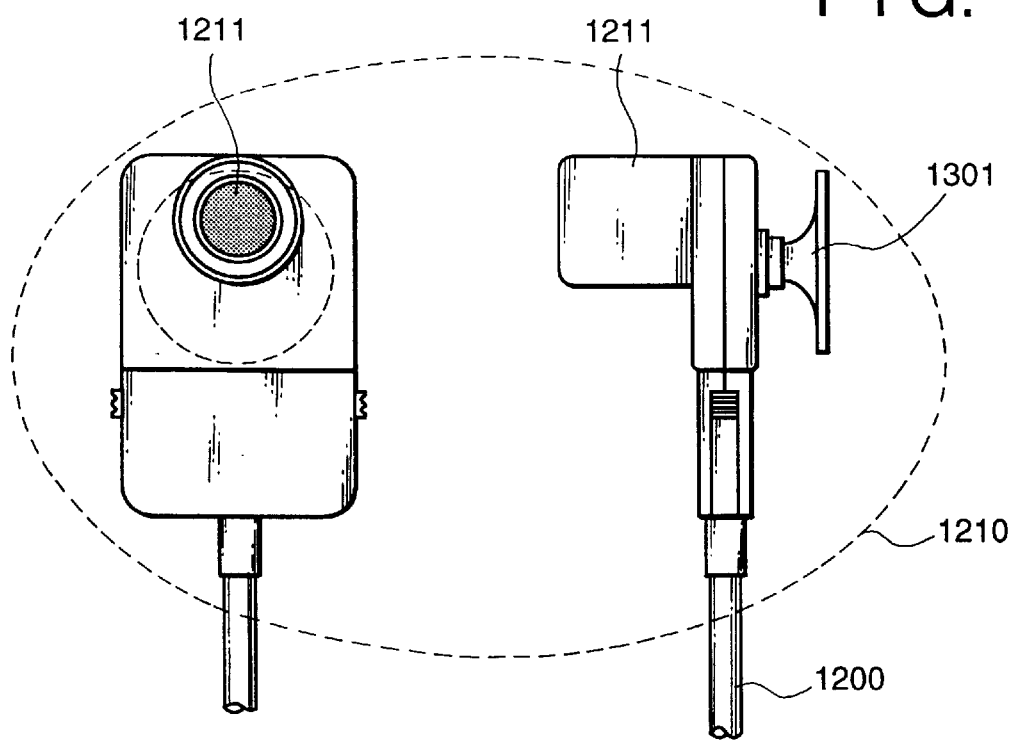
FIG. 34 is an external view showing fixing means provided with a suction cup in the seventh embodiment.

FIG. 34 illustrates an arrangement in which the suction cup 1301 is provided on the back surface of the lens unit 1211 as fixing means.

Figure 35:
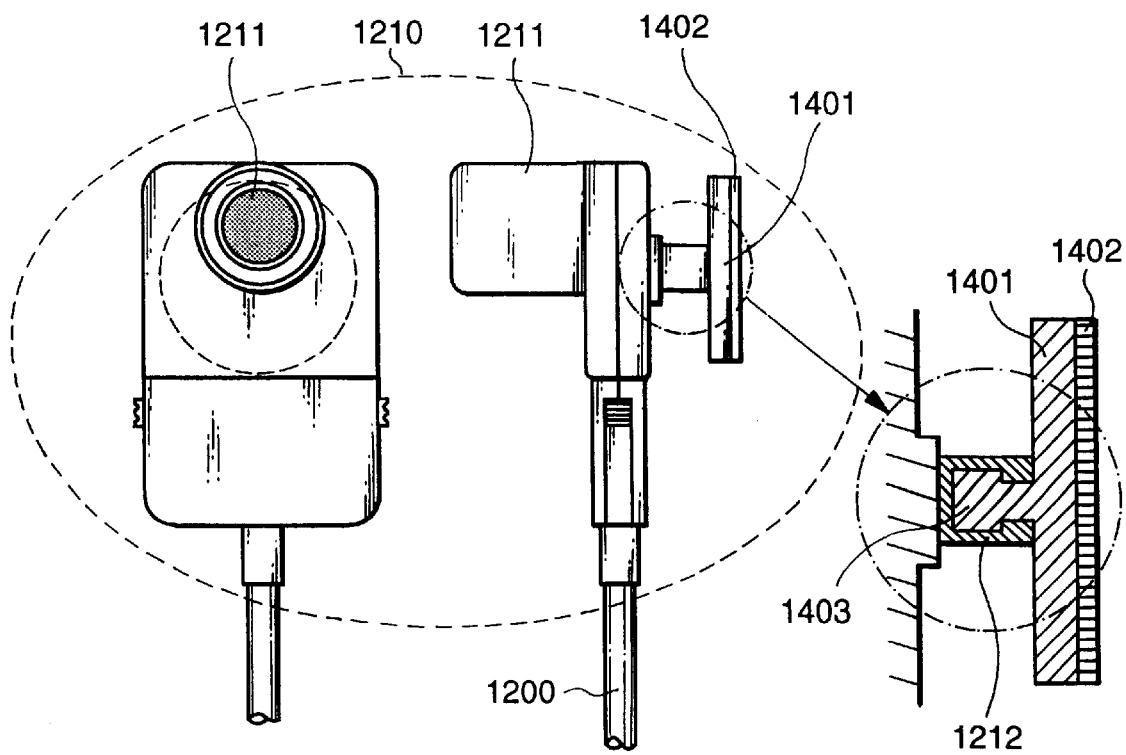
FIG. 35 is an external view showing fixing means provided with an adhesive member.

FIG. 35 shows the external arrangement of the camera unit 1210 and a cross section of the principal components of the camera unit. Here the suction cup 1301 in the arrangement of FIG. 34 is replaced by the adhesive member 1402, which is provided on the back surface of the camera via a flexible support member 1401. The flexible support member 1401 and adhesive member 1402 are affixed to each other by a bonding agent strongly enough so that they will not separate under ordinary use. The flexible support member 1401 has a projection 1403 to prevent it from falling off. This projection is fitted into an engagement portion 1212 provided on the housing of the camera unit 1210. The engagement portion 1212 is formed as an integral part of the camera housing.

In this arrangement, the portion for attaching the suction-cup member 1301 of FIG. 34 to the housing is given a shape the same as that mentioned above so that commonality is achieved with regard to the shape on the camera side. As a result, it is possible to select fixing means adapted to adapted to almost all monitor configurations and surface shapes. Thus, the present invention can be applied broadly and at low cost.

As for the adhesive member 1402, it is possible to use a substance which manifests an adhesive property by adjusting the degree of vulcanization of urethane rubber, by way of example. Such a substance is adhesive at all times under ordinary temperatures. If it becomes contaminated with clinging dust or the like, the contaminants can be wiped off using water or alcohol to restore the original adhesive property. Accordingly, the substance is suited to the camera fixing means of an image communication apparatus intended for general users.

FIGS. 36A and 36B are illustrative views showing the construction of the camera unit of an image input unit according to the seventh embodiment of the invention. FIG. 36A is an external front view and FIG. 36B a sectional view of the principal components.

Shown in FIGS. 36A and 36B are a back cover 1310, a resilient member 1311, a front cover 1320, a lens barrel unit 1330, a photographic lens group 1331, a focus spacer 1340, an area sensor 1350, a connector receptacle 1360, a flexible printed circuit board 1370, a connector plug 1380 an unlock button 1381 of the same plug, and a connecting cord for transmitting an image signal, a clock, a synchronizing signal, etc.

The lens barrel unit 1330 holding the lens group 1331 is threadedly engaged with the focus spacer 1340 and turns relative to the spacer so that a focusing adjustment can be performed. The focus spacer 1340 has a spot facing 1341 which mates with the exterior of the package of area sensor 1350, which consists of a transparent plastic package. By being brought into abutting contact with the front face of the package, the spacer effects positioning along three axes.

The flexible printed circuit board 1370 on which the area sensor 1350, the connector receptacle 1360 and peripheral elements (not shown) are mounted is clamped between the front cover 1320 and back cover 1310 via the resilient member 1311, such as a sponge or rubber sheet, disposed at the back of the area sensor 1350 in the plane of the board. Thus the board is clamped in the abutting state. By providing the cover members or the flexible printed circuit board itself with an elastically deformed urging member, the resilient member 1311 may be eliminated. Further, the connector receptacle 1360 that couples with the connector plug 1380 is surface-mounted on the flexible printed circuit board 1370 and is mechanically connected to either the front cover 1320 or back cover 1310 to provide mechanical strength.

In accordance with the image communication apparatus of the seventh embodiment described above, it is possible to dispose the optic axis of the camera in coincidence with the user's line of sight while leaving the monitor screen in view. Thus, coincidence of lines of sight, which does not rely upon a method of actually aligning the lines of sight, can be achieved using an approximation solution which is efficient and inexpensive.

The present invention can be applied to a system constituted by a plurality of devices or to an apparatus comprising a single device.

Furthermore, the invention is applicable also to a case where the invention is embodied by supplying a program to a system or apparatus. In this case, a storage medium, storing a program according to the invention constitutes the invention. The system or apparatus installed with the program read from the medium realizes the functions according to the invention.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus being detachably connected to an information processing device having an insertion slot, and sensing an image to supply to the information processing device, said apparatus comprising:

a camera unit; and a base unit being in a form of a card-like shape and connected to said camera unit, said base unit having:
an audio input unit which inputs audio; and
an audio output unit which outputs audio;
an insertion connector capable of being inserted into and extracted from the insertion slot of the information processing device;
a signal processing circuit which processes to supply an image signal from said camera unit and an audio signal from said audio input unit to the information processing device, and processes to supply an audio signal from said information processing device to said audio output unit; and
an internal control unit which controls the timing of sending the image signal to the information processing device, thereby the timing is controlled by the image sensing apparatus.

2. An image sensing apparatus according to claim 1, wherein said camera unit comprises a lens, and a sensor converting incident light from an object through the lens into an image signal.

3. An image sensing apparatus according to claim 1, wherein said signal processing circuit comprises memory which stores an image signal sensed by said camera unit.

4. An image sensing apparatus according to claim 3, wherein said memory comprises a first-in-first-out type memory.

5. An image sensing apparatus according to claim 1, wherein said signal processing circuit comprises a register used for transmitting and receiving data to and from the information processing device.

6. An image sensing apparatus according to claim 1, wherein said audio output unit is provided at a same side surface of said base unit at which said base unit is connected to said camera unit.

7. An image sensing apparatus according to claim 1, wherein said audio output unit and said camera unit are connected to said base unit through a cable.

8. The image sensing apparatus according to claim 1, wherein the attributes of the image signal include information regarding whether the image is monochromatic or color, the number of pixels horizontally or vertically, or the number of grays.

9. An image sensing apparatus according to claim 1, further comprising, an output unit which outputs configuration information of said camera unit to the information processing device in a case where said base unit is inserted into the insertion slot, thereby enabling the information processing device to recognize attributes of the image signal from said camera unit.

* * * * *

UNITED STATES PATENT AND TRADEMARK OFFICE
CERTIFICATE OF CORRECTION

PATENT NO. : 6,670,985 B2
DATED : December 30, 2003
INVENTOR(S) : Karube et al.

It is certified that error appears in the above-identified patent and that said Letters Patent is hereby corrected as shown below:

Title page,
Item [62], Related U.S. Application Data, replace the phrase "Division of application No. 08/534,545, filed on Sep. 27, 1995" with -- Division of application No. 08/534,545, filed on Sep. 27, 1995, now Pat. No. 6,654,050 --.

Signed and Sealed this

Thirteenth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,670,985 B2
DATED : December 30, 2003
INVENTOR(S) : Karube et al.

It is certified that error appears in the above-identified patent and that said Letters Patent is hereby corrected as shown below:

Column 1,
Line 26, delete "4" and insert -- 1 --

Column 5,
Line 36, delete "to use" and insert -- allows use of --
Lines 51-52, delete "in image sensing apparatus"

Column 13,
Line 29, delete "3$a$2" and insert -- 3$ab$ --

Column 14,
Line 1, delete "will"

Signed and Sealed this

Twenty-fourth Day of May, 2005

JON W. DUDAS
*Director of the United States Patent and Trademark Office*